United States Patent
Thuo et al.

(10) Patent No.: US 11,673,190 B2
(45) Date of Patent: Jun. 13, 2023

(54) SYSTEM AND METHOD FOR MANUFACTURE OF UNDERCOOLED METALLIC CORE-SHELL PARTICLES

(71) Applicant: SAFI-Tech, Inc., Ames, IA (US)

(72) Inventors: Martin Thuo, Ames, IA (US); Ian Tevis, Ames, IA (US); Chris Frankiewicz, Ames, IA (US)

(73) Assignee: SAFI-TECH, INC., Ames, IA (US)

( * ) Notice: Subject to any disclaimer, the term of this patent is extended or adjusted under 35 U.S.C. 154(b) by 0 days.

(21) Appl. No.: 17/564,325

(22) Filed: Dec. 29, 2021

(65) Prior Publication Data

US 2022/0212250 A1 Jul. 7, 2022

Related U.S. Application Data

(60) Provisional application No. 63/133,537, filed on Jan. 4, 2021.

(51) Int. Cl.
*B22F 1/054* (2022.01)
*B01J 8/08* (2006.01)
(Continued)

(52) U.S. Cl.
CPC ............... *B22F 1/054* (2022.01); *B01J 8/085* (2013.01); *B01J 10/005* (2013.01); *B01J 13/025* (2013.01);
(Continued)

(58) Field of Classification Search
CPC ........ B22F 1/054; B22F 9/06; B22F 2303/35; B22F 2009/065; B22F 1/102; B22F 1/16;
(Continued)

(56) References Cited

U.S. PATENT DOCUMENTS 4,042,374 A * 8/1977 Rasmussen ............. B22F 9/002
75/364
4,153,156 A 5/1979 Seemann
(Continued)

FOREIGN PATENT DOCUMENTS

JP 09323174 12/1997
WO 2011092509 8/2011
(Continued)

OTHER PUBLICATIONS

"Adlayer", Wiktionary [online[. Retrieved from the Internet: <URL: https://en.wiktionary.org/w/index.php?title=adlayer&oldid=51722911>, (Mar. 12, 2019), 1 pg. Mar. 12, 2019.
(Continued)

*Primary Examiner* — Huy Tram Nguyen
(74) *Attorney, Agent, or Firm* — BrownWinick Law Firm; Christopher A. Proskey

(57) ABSTRACT

A system and method are presented for producing metallic core-shell particles. The system includes the housing having a hollow interior configured to receive and hold a molten metal input, a carrier fluid, and one or more reagents. The system also includes a shearing assembly positioned within the hollow interior of the housing. The shearing assembly is configured to, when the molten metal input, carrier fluid, and one or more reagents are held withing hollow interior and sealed within housing, shear the molten metal input into particles of an effective size so that a shell created on a surface of the particles via reaction with the one or more reagents prevents a core of the particles from solidifying when the particles are cooled to a temperature below a freezing temperature of the molten metal input.

26 Claims, 31 Drawing Sheets

(51) Int. Cl.

| | |
|---|---|
| *B01J 14/00* | (2006.01) |
| *B01J 19/00* | (2006.01) |
| *B22F 9/06* | (2006.01) |
| *B01J 19/02* | (2006.01) |
| *B01J 10/00* | (2006.01) |
| *B01J 13/02* | (2006.01) |

(52) U.S. Cl.
CPC ............ *B01J 14/00* (2013.01); *B01J 19/0066* (2013.01); *B01J 19/0073* (2013.01); *B01J 19/02* (2013.01); *B22F 9/06* (2013.01); *B22F 2303/35* (2013.01)

(58) Field of Classification Search
CPC ........ B01J 8/085; B01J 10/005; B01J 13/025; B01J 14/00; B01J 19/0066; B01J 19/0073; B01J 19/02; C22C 1/0466; C22C 1/0483; C22C 13/00; C22C 5/02
USPC ........................................................ 266/216
See application file for complete search history.

(56) References Cited

U.S. PATENT DOCUMENTS

| | | | |
|---|---|---|---|
| 4,273,827 A | 6/1981 | Sweeney | |
| 4,282,034 A | 8/1981 | Smith | |
| 4,514,125 A | 4/1985 | Stol | |
| 4,519,866 A | 5/1985 | Stol | |
| 4,913,263 A | 4/1990 | Spiers | |
| 5,769,308 A | 6/1998 | Kokusho | |
| 6,106,739 A | 8/2000 | Stephens | |
| 7,803,212 B2 * | 9/2010 | Forbes Jones | B22F 9/14 75/336 |
| 8,221,676 B2 * | 7/2012 | Forbes Jones | B01J 2/04 266/237 |
| 9,026,007 B2 | 5/2015 | Bisaji et al. | |
| 9,907,117 B2 | 2/2018 | Su et al. | |
| 10,124,310 B2 | 11/2018 | Thuo | |
| 10,266,925 B2 | 4/2019 | Thuo | |
| 10,293,325 B2 | 5/2019 | Thuo | |
| 10,471,469 B2 | 11/2019 | Thuo | |
| 10,526,694 B2 | 1/2020 | Thuo | |
| 10,604,677 B2 | 3/2020 | Thuo | |
| 10,758,984 B2 | 9/2020 | Thuo | |
| 2005/0250878 A1 | 11/2005 | Moore | |
| 2008/0251164 A1 | 10/2008 | Lohwongwatana | |
| 2010/0216632 A1 | 8/2010 | Adzic | |
| 2012/0067615 A1 | 3/2012 | Blaiszik | |
| 2013/0244037 A1 | 9/2013 | Hohman | |
| 2016/0317992 A1 | 11/2016 | Thuo | |
| 2017/0014958 A1 | 1/2017 | Thuo | |
| 2017/0120295 A1 | 5/2017 | Thuo | |
| 2017/0326523 A1 | 11/2017 | Thuo et al. | |
| 2019/0203327 A1 | 7/2019 | Thuo et al. | |

FOREIGN PATENT DOCUMENTS

| | | |
|---|---|---|
| WO | 2015089309 | 6/2015 |
| WO | 2017011029 | 1/2017 |

OTHER PUBLICATIONS

Bowden, Ned, et al., "Chapter 4—Mesoscale self-assembly: the assembly of micron- and millimeter-sized objects using capillary forces", Supramolecular Organization and Materials Design, Editors W. Jones, et al.; Cambridge University Press, (2001), 103-145 Jan. 1, 2001.

Dragnevski, Kalin I., et al., "The effect of experimental variables on the levels of melt undercooling", Materials Science and Engineering: A, 375-377 (Jul. 2004), 485-487 Apr. 1, 2004.

Martin, Andrew, et al., "Heat-Free Fabrication of Metallic Interconnects for Flexible/Wearable Devices", Adv. Funct. Mater., 29(40), 1903687, (2019), 9 pgs. Jan. 1, 2009.

"International Application Serial No. PCT/US2016/000058, International Search Report dated Oct. 18, 2016", 4 pgs Jan. 1, 2020.

Bowden, Ned, et al., "Mesoscale Self-Assembly: Capillary Bonds and Negative Menisci", J. Phys. Chem. B, 104, (2000), 2714-2724 Jan. 1, 2000.

Bowden, Ned B, "Molecule-Mimetic Chemistry and Mesoscale Self-Assembly", Acc. Chem. Res., 34, (2001), 231-238 Jan. 1, 2001.

Bowden, Ned, "Self-Assembly of Mesoscale Objects into Ordered Two-Dimensional Arrays", Science New Series, vol. 276, No. 5310, (Apr. 11, 1997), 233-235 Apr. 11, 1997.

Bowden, Ned, et al., "Self-Assembly of Microscale Objects through Lateral Capillary Forces", Langmuir, 17, (2001), 1757-1765 Jan. 1, 2001.

Cadirli, E, et al., "The effect of growth rate on microstructure and microindentaiton hardness in the In—Bi—Sn ternary alloy at low melting point", Journal of Alloys and Compounds, 470, (2009), 150-156 Jan. 1, 2009.

Changsoon, Kim, et al., "Fabrication of Organo Light-emitting Devices by Low Pressure Cold Welding", Adv. Mater. Sci., 15, No. 6, (2003), 541-545 Jan. 1, 2003.

Dickey, Michael D, "Emerging Applications of Liquid Metals Featuring Surface Oxides", Applied Materials & Interfaces, 6, (2014), 18369-18379 Jan. 1, 2014.

Dickey, Michael D, et al., "Eutectic Gallium-Indium (EGain): A Liquid Metal Alloy for the Formation of Stable Structures in Microchannels at Room Temperature", Adv. Funct. Mater., 18, (2018), 1097-1104 Jan. 1, 2008.

Durgesh, et al., "Cold welding: a phenomenon for spontaneous self-healing and shape genesis at the nanoscale", Mater. Horiz., 2, (2015), 157-167 Jan. 1, 2015.

Ferguson, Gregory S, "Contad Adhesion of Thin Films on Elastomeric Supports: Cold Welding Under Ambient Conditions", Science, vol. 253, No. 5021 (1991), 776-778 Jan. 1, 1991.

Gao, Fan, et al., "Effect of surface oxide on the melting behavior of lead-free solder nanowires and nanorods" Jan. 1, 2020.

Gao, Fan, et al., "Synthesis, Characterization, and Thermal Properties of Nanoscale Lead-Free Solders on Multisegmented Metal Nanowires", J. Phys. Chem., 113, (2009), 9456-9552 Jan. 1, 2009.

Garnett, Erik C, et al., "Self-limited plasmonic welding of silver nanowire junctions", vol. 11, (Mar. 2012), 241-249 Mar. 1, 2012.

Herlach, D M, "Containerless Undercooling and Solidification of Pure Metal", Annu. Rev. Mater. Sci., 21, (1991), 23-44 Jan. 1, 1991.

Holland-Moritz, D, et al., "Short-range order of stable and undercooled liquid titanium", Materials Science and Engineering A vol. 449-451, (Mar. 25, 2007), 42-45 Mar. 25, 2007.

Hutter, Tanya, et al., "Formation of Spherical and Non-Spherical Eutectic Glalium-Indium Liquid-Metal Microdroplets in Microfluidic Channels at Room Tempurature", Adv. Funct. Mater. 22, (2012), 2624-2632 Jan. 1, 2012.

Ismagilov, Rustem F, et al., "Autonomous Movement and Self-Assembly", Angew. Chem. Int. Ed., 41, No. 4, (2002) Jan. 1, 2002.

Kato, Hidemi, et al., "Surface-activated supercooled liquid brazing", Scripta Materialia, 68, (2013), 699-702 Jan. 1, 2013.

Koppes, John P, et al., "Utilizing the thermodynamic nanoparticle size effeds for low temperature Pb-fee solder", Materials Science and Engineering B, 177, (2012), 197-204 Jan. 1, 2012.

Laza, Simona C, et al., "Seledive Cold Welding if Colloidal Gold Nanorods", Part. Syst. Charact., 30, (2013), 584-589 Jan. 1, 2013.

Lu, Yang, et al., "Cold Welding of ultrathin gold nanowire", Nature Technology, vol. 5, (Mar. 2010), 218-224 Mar. 1, 2010.

Mullis, A M, et al., "The solidification of undercooled melts via twinned dendritic growth", Materials Science and Engineering A, 375-377, (2004), 547-551 Jan. 1, 2004.

Parravicini, G. B, et al., "Extreme undercooling (down to 90K) of liquid metal nanoparticlesAppl", Phys. Lett., 891, (2006), 033123 Jan. 1, 2006.

Patra, Debabrata, et al., "Fabrication of Conductive Microcapsules via Self-Assembly and Crosslinking of Gold Nanowires at Liquid-Liquid Interfaces", Small, 6, No. 13, (2010), 1402-1405 Jan. 1, 2010.

Peng, Yong, et al., "Bottom-up Nanoconstruction by the Welding of Individual Metallic Nanoobjects Using Nanoscale Solder", Nano Letters, vol. 9, No. 1, (2009), 91-96 Jan. 1, 2009.

(56) References Cited

OTHER PUBLICATIONS

Perepezko, J H, et al., "Undercooling and solidification of atomized liquid droplets", Materials Science and Engineering, A326, (2002), 144-153 Jan. 1, 2002.

Perepezko, J H, et al., "Undercooling Behavior of Liquid Metals", Elsevier Publishing Co., Inc., (1991), 49-62 Jan. 1, 1991.

Perepezko, John H, "Nucleation in Undercooled Liquids", Materials Science and Engineering, 65, (1984) 125-135 Jan. 1, 1984.

Qi, W H, "Size and shape dependent melting temperature of metallic nanoparticles", Materials Chemistry and Physics 88, (2004), 280-284 Jan. 1, 2004.

Shen, Lu, et al., "Nanoindentation study on creep resistance of SnBi solder ally with readive nano-metallic fillers", Materials Science & Engineering, A561, (2013), 232-238 Jan. 1, 2013.

Sivan, Vijay, et al., "Liquid Metal Particles", Adv. Funct. Mater. 23, (2013), 144-152 Jan. 1, 2013.

Suganuma, Katsuaki, "Advances in lead-free electronics solder", Current Opinion in Solid State and Material Science, 5, (2001), 55-64 Jan. 1, 2001.

Sun, Z, et al., "The Application of Electron Beam Welding for the Joining of Dissimilar Metals: An Overview", J. of Material Processing Technology, 59, (1996), 257-267 Jan. 1, 1996.

Tevis, I. D, et al., "Synthesis of Liquid Core-Shell Particles and Solid Patchy Multicomponent Particles by Shearing Liquids Into Complex Particles (SLICE)", Langmuir, 30, (2014), 14308-14313 Jan. 1, 2014.

Thuo, Martin, et al., "Odd-Even Effects in Charge Transport acorss Self-Assembled Monolayers", JACS, (2011), 2962-2975 Jan. 1, 2011.

Weiss, Emily A, et al., "Si/SiO2-Templated Formation for Ultraflat Metal Surfaces on Glass, Polymer, and Solder Supports: Their Use for Self-Assembled Monolayers", Langmuir, 23, (2007), 9686-8694 Jan. 1, 2007.

Witusiewicz, V T, et al., "Thermodynamic re-optimisation of Bi—In—Sn system bsed on new experimental data", Journal of Alloys and Compounds, 428, (2007), 115-124 Jan. 1, 2007.

Wolfe, Daniel B, et al., "Mesoscale Self-Assembly: Capillary Interactions When Positive and Negative Menisic Have Similar Amplitudes", Langmuir, 19, (2003), 2206-2214 Jan. 1, 2003.

Xiaopeng, Xi, et al., "Nanwire Joining Methods", The Open Science, 3, (2011), 91-104 Jan. 1, 2011.

Zhou, Y, et al., "From Microjoining to Nanojoining", The Open Science Journal, 3, (2011), 32-42 Jan. 1, 2011.

Zuo, Young, "Evolution of Microstructure Across Eutectic Sn—Bi Solder Joints Under Simultaneous Thermal Cycling and Current Sensing", Journal of Electronic Materials, vol. 44, No. 1, (2015) Jan. 1, 2015.

"European Application Serial No. 16824809.4, Extended European Search Report Received dated Jun. 25, 2019", 12 pgs. Jan. 1, 2020.

U.S. Appl. No. 16/298,743, filed with non-publication request Mar. 13, 2019.

International Search Report and Written Opinion—PCT/US21/65451 dated Mar. 15, 2022.

* cited by examiner

SYSTEM AND METHOD FOR MANUFACTURE OF UNDERCOOLED METALLIC CORE-SHELL PARTICLES

CROSS REFERENCE TO RELATED APPLICATIONS

This application claims priority to U.S. Provisional Patent Application 63/133,537 filed on Jan. 4, 2021 and titled "SYSTEM FOR MANUFACTURE OF UNDERCOOLED METALLIC CORE-SHELL PARTICLES", the entirety of which is hereby fully incorporated by reference herein.

This application is related to PCT Patent Publication WO 2017011029 titled "STABLE UNDERCOOLED METALLIC PARTICLES FOR ENGINEERING AT AMBIENT CONDITIONS"; U.S. Pat. No. 10,266,925 titled "STABLE UNDERCOOLED METALLIC PARTICLES FOR ENGINEERING AT AMBIENT CONDITIONS"; and U.S. Patent Publication 2018/0354037 titled "DIRECT PRINTING AND WRITING USING UNDERCOOLED METALLIC CORE-SHELL PARTICLES", all of which are hereby fully incorporated by reference herein.

FIELD OF THE DISCLOSURE

The present disclosure relates to manufacturing equipment and more particularly to systems and equipment for the manufacture of undercooled metallic core-shell particles including micro/nano particles.

OVERVIEW OF THE DISCLOSURE

Undercooling of metals (also known as supercooling) refers to the cooling of a liquid metal or alloy below its melting/freezing point without it becoming solid. Due to the metastable nature of undercooled metals, the production of undercooled metal in practical yields and at any size scale is a particular challenge, especially where large undercooling values are desired. One method for producing undercooled metal particles uses a container-less drop tube technique, where one particle is undercooled at a time during free fall. Another method using droplet emulsion allows for the production of more than one particle at once if the carrier liquid can maintain a thin, inert surface coating inhibiting crystallization, however, stability is still a major concern.

Thus, it is a primary object of the disclosure to provide a system for manufacture of undercooled metallic core-shell particles, including micro/nano particles, that improves upon the state of the art.

Another object of the disclosure is to provide a system for manufacture of undercooled metallic core-shell particles that reduces manufacturing time.

Yet another object of the disclosure is to provide a system for manufacture of undercooled metallic core-shell particles that increases yields.

Another object of the disclosure is to provide a system for manufacture of undercooled metallic core-shell particles from materials having higher melting temperatures.

Yet another object of the disclosure is to provide a system for manufacture of undercooled metallic core-shell particles that reduces power requirements.

Another object of the disclosure is to provide a system for manufacture of undercooled metallic core-shell particles that increases throughput.

Yet another object of the disclosure is to provide a system for manufacture of undercooled metallic core-shell particles that is easy to use.

Another object of the disclosure is to provide a system for manufacture of undercooled metallic core-shell particles that improves functionality.

Yet another object of the disclosure is to provide a system for manufacture of undercooled metallic core-shell particles that is relatively inexpensive.

Another object of the disclosure is to provide a system for manufacture of undercooled metallic core-shell particles that is adaptable for manufacture of different products.

Yet another object of the disclosure is to provide a system for manufacture of undercooled metallic core-shell particles that can control temperature while processing materials.

Another object of the disclosure is to provide a system for manufacture of undercooled metallic core-shell particles that can control pressure while processing materials.

Yet another object of the disclosure is to provide a system for manufacture of undercooled metallic core-shell particles that can control flow of materials while processing the materials.

Another object of the disclosure is to provide a system for manufacture of undercooled metallic core-shell particles that can control and adjust atmosphere and reagents while processing materials.

Yet another object of the disclosure is to provide a system for manufacture of undercooled metallic core-shell particles that produces a relatively inexpensive product. Another object of the disclosure is to provide a system for manufacture of undercooled metallic core-shell particles that has a minimum number of parts.

Yet another object of the disclosure is to provide a system for manufacture of undercooled metallic core-shell particles that is durable.

Another object of the disclosure is to provide a system for manufacture of undercooled metallic core-shell particles that has a long useful life.

These and other objects, features, or advantages of the present disclosure will become apparent from the specification, claims and drawings.

SUMMARY OF THE DISCLOSURE

In one or more arrangements, an enclosure system is presented for producing metallic core-shell particles. The enclosure system includes the housing having a front, a back, a top, a bottom, and opposing sides. The front, back, top, bottom, and opposing sides form a hollow interior of the housing. The housing includes a first opening in the top of the housing. An upper door assembly is connected to the housing. The upper door assembly is configured to provide access to the hollow interior through the first opening when open and cover and seal the first opening when closed. The housing includes a second opening in the bottom of the housing. A lower door assembly is connected to the housing. The lower door assembly is configured to provide access to the hollow interior through the second opening when open and cover and seal second opening when closed. A shearing assembly is positioned within the hollow interior of the housing. The shearing assembly is configured to, when a molten metal input, a carrier fluid, and one or more reagents are held withing hollow interior and sealed within housing, shear the molten metal input into particles of an effective size so that a shell created on a surface of the particles via reaction with the one or more reagents prevents a core of the particles from solidifying when the particles are cooled to a temperature below a freezing temperature of the molten metal input.

DETAILED DESCRIPTION OF THE DISCLOSURE

Figure 1:
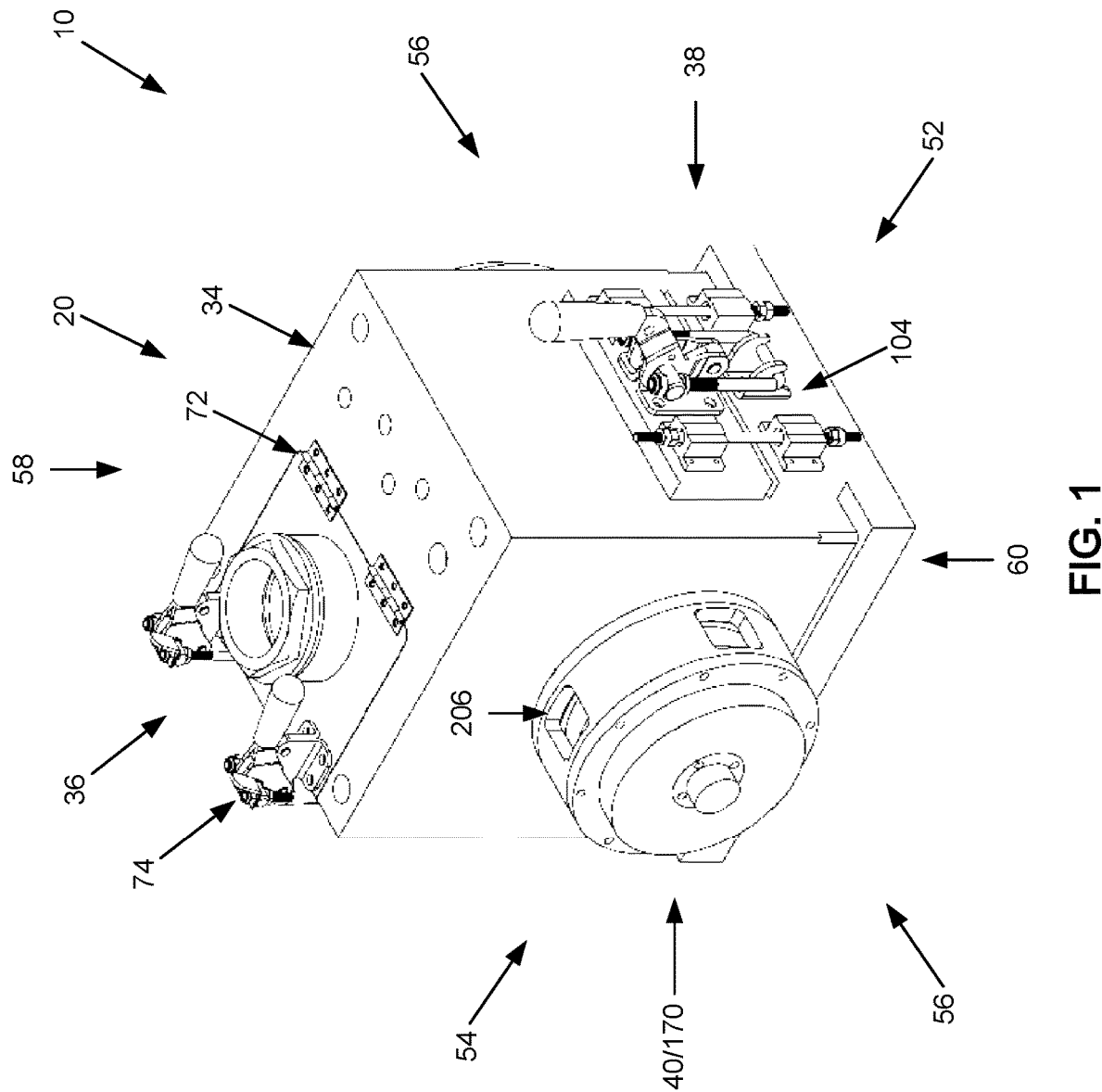
FIG. 1 shows an upper front right perspective view of enclosure system for producing metallic core-shell particles, in accordance with one or more arrangements.
Figure 2:
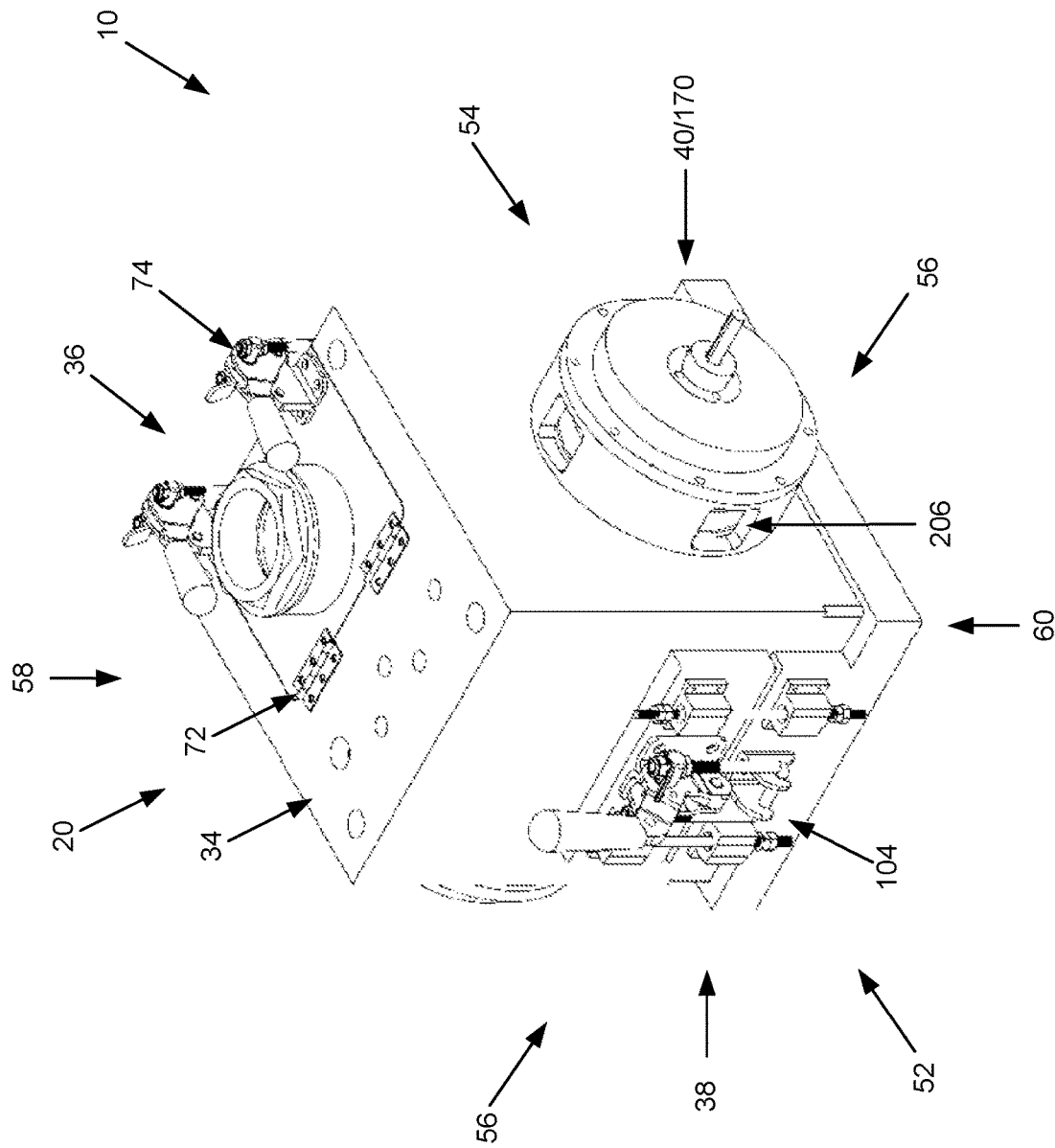
FIG. 2 shows an upper front left perspective view of enclosure system for producing metallic core-shell particles, in accordance with one or more arrangements.
Figure 3:
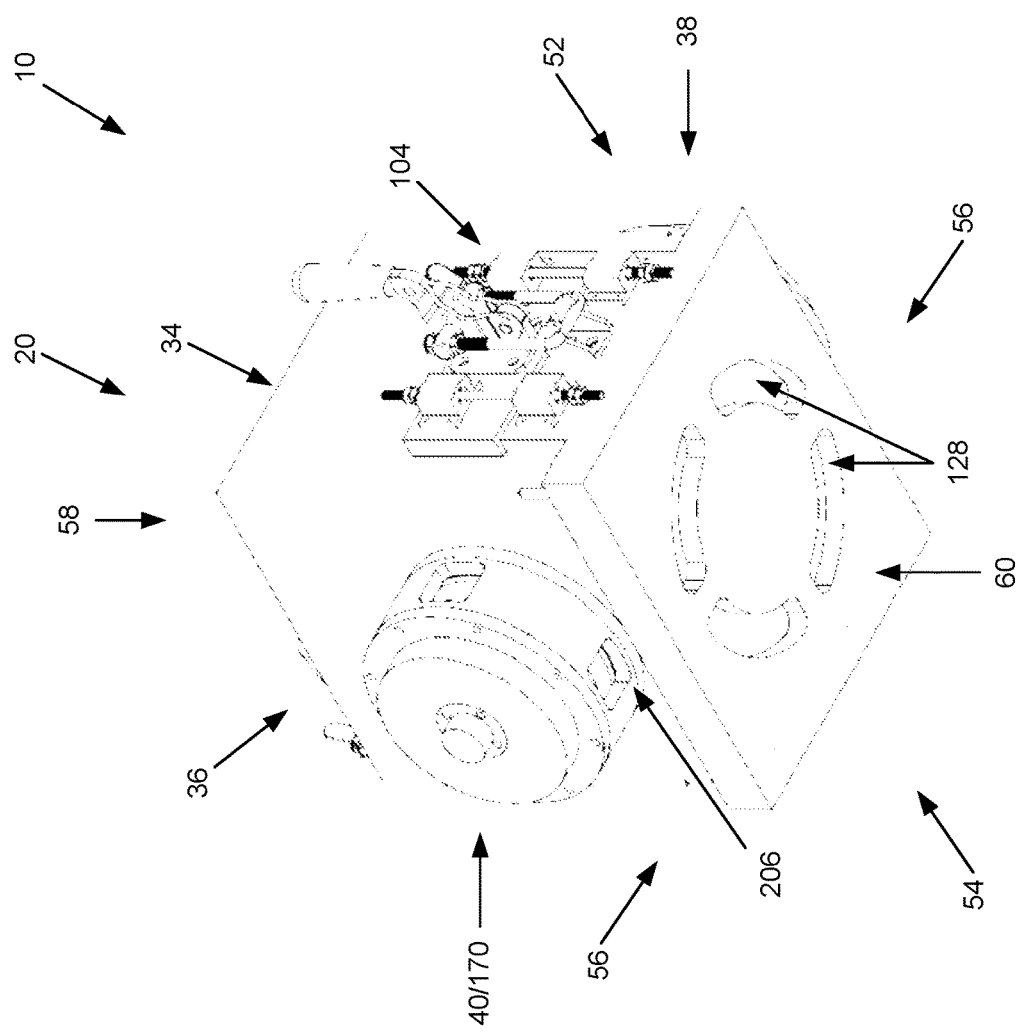
FIG. 3 shows a lower front right perspective view of enclosure system for producing metallic core-shell particles, in accordance with one or more arrangements.
Figure 4:
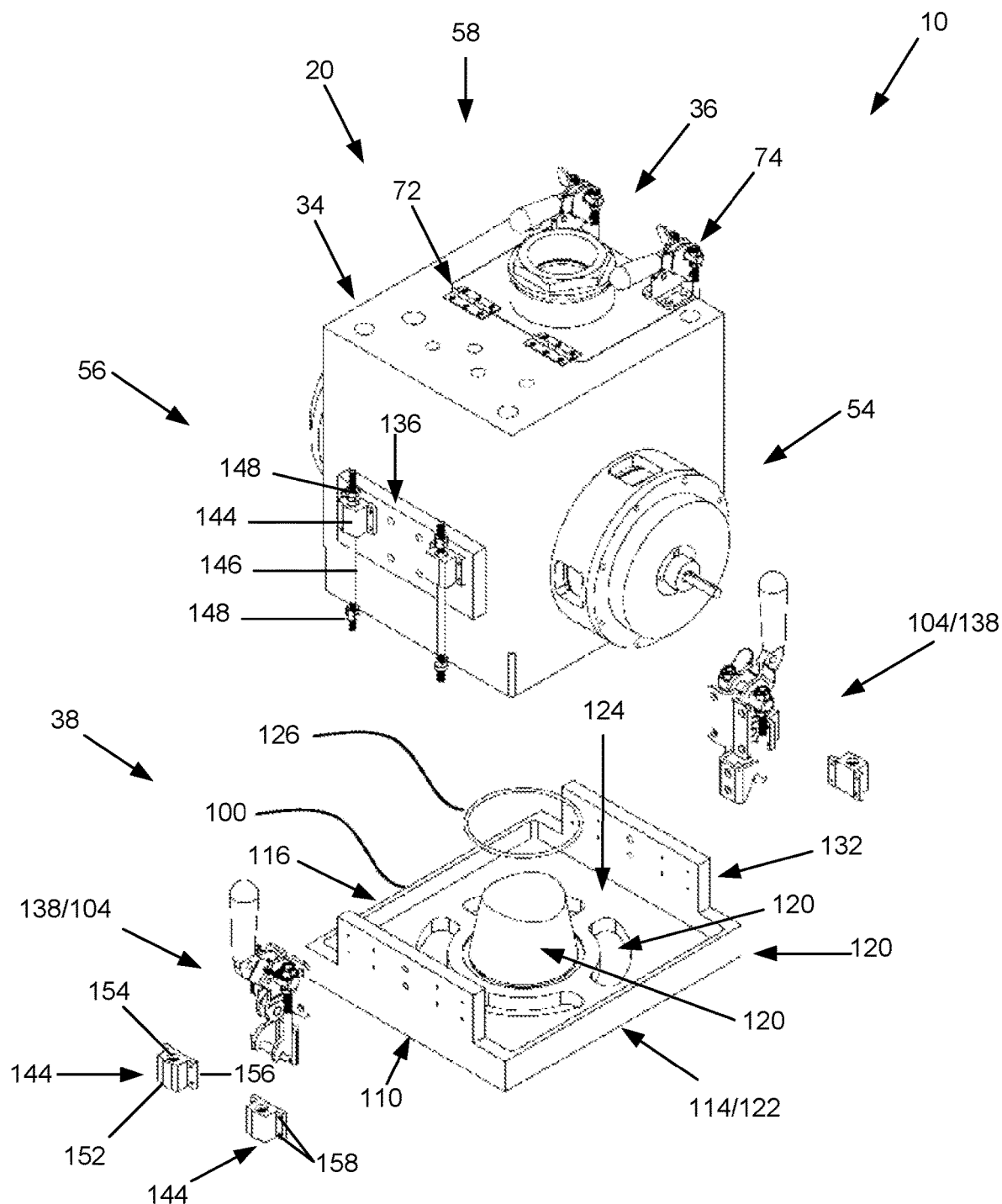
FIG. 4 shows an upper front left perspective view of enclosure system for producing metallic core-shell particles, in accordance with one or more arrangements; the view showing an exploded view of a lower door assembly of the enclosure system.
Figure 5:
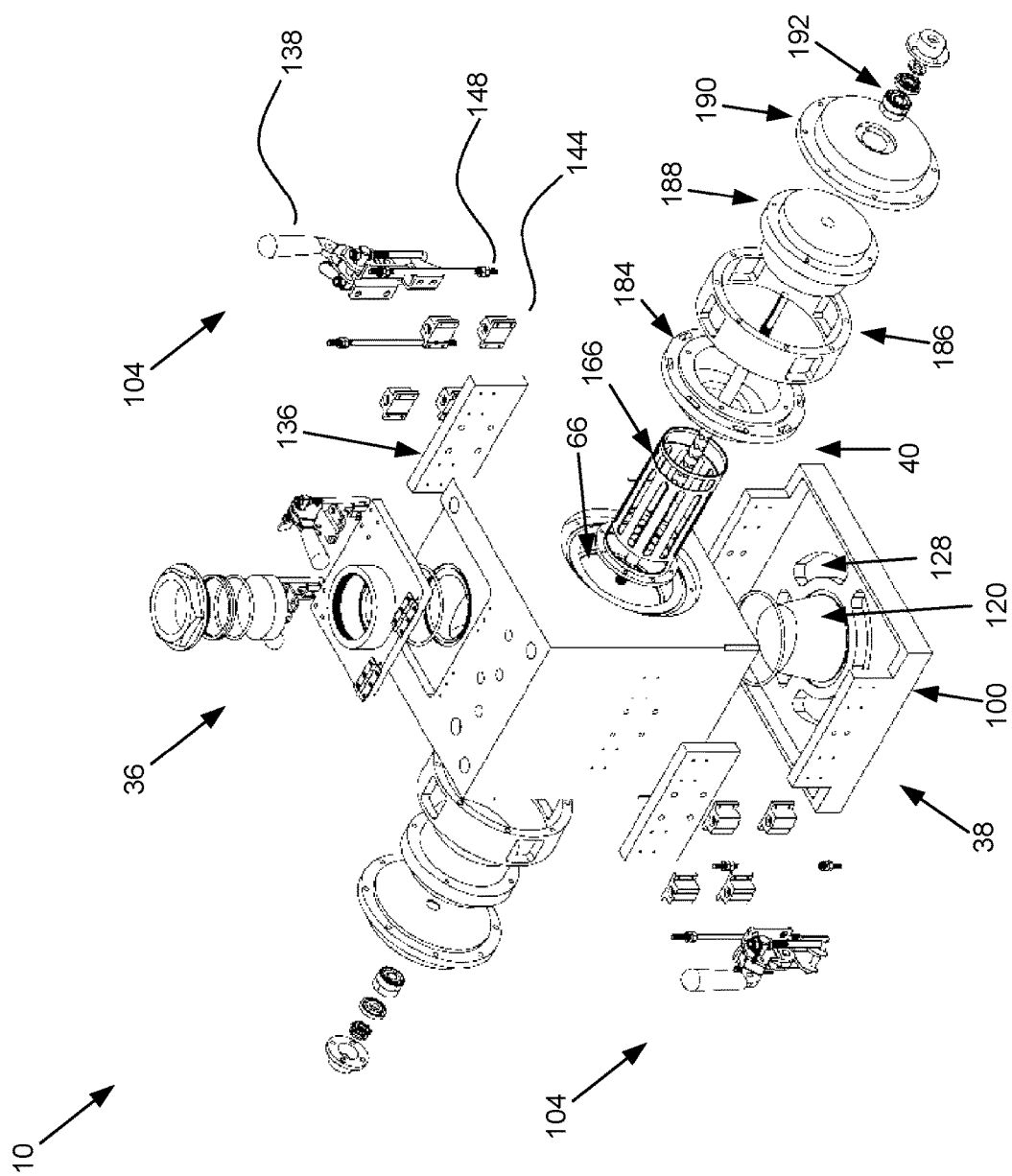
FIG. 5 shows an exploded upper front left perspective view of enclosure system for producing metallic core-shell particles, in accordance with one or more arrangements.
Figure 6:
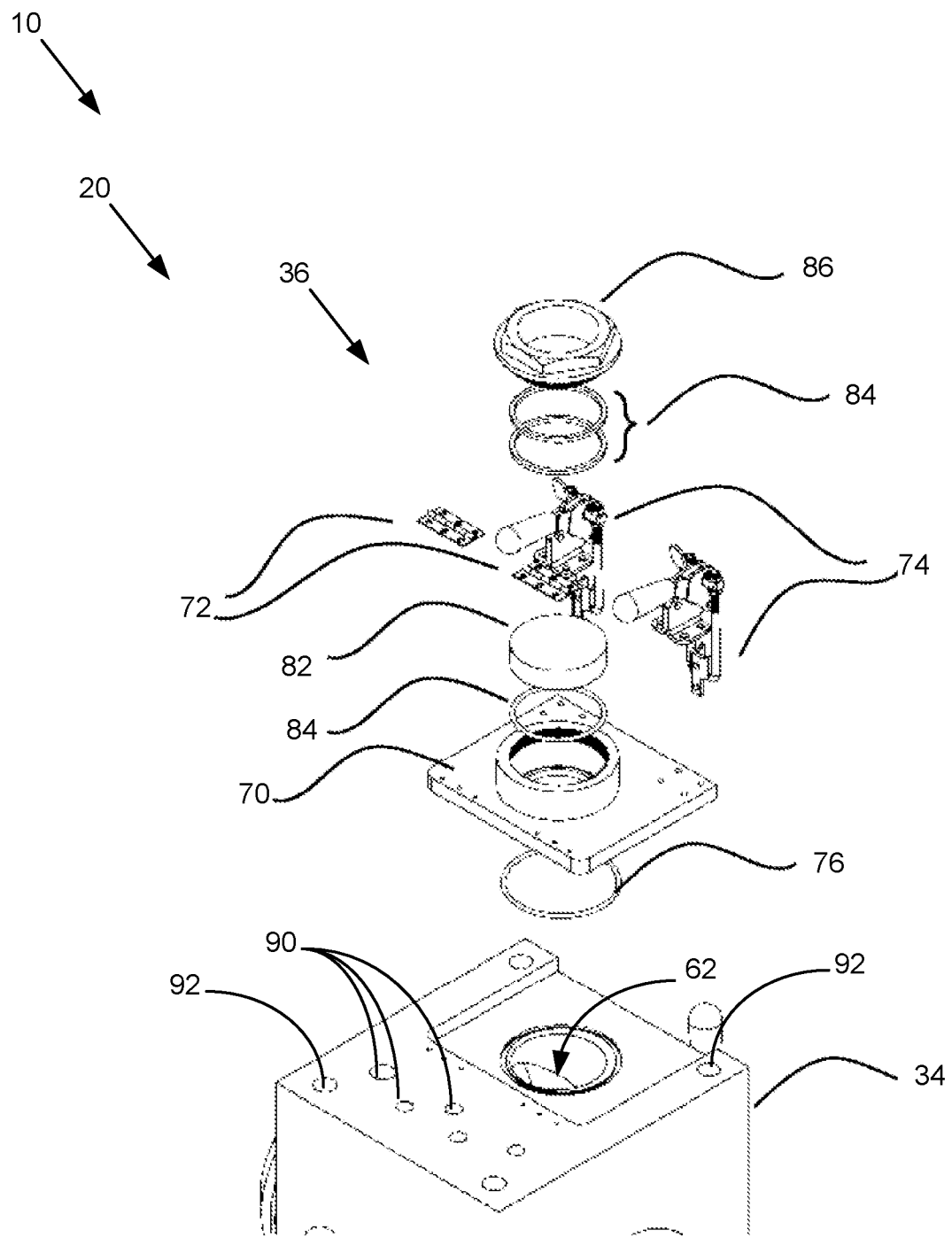
FIG. 6 shows an exploded upper front left perspective view of an upper door assembly of an enclosure system for producing metallic core-shell particles, in accordance with one or more arrangements.
Figure 7:
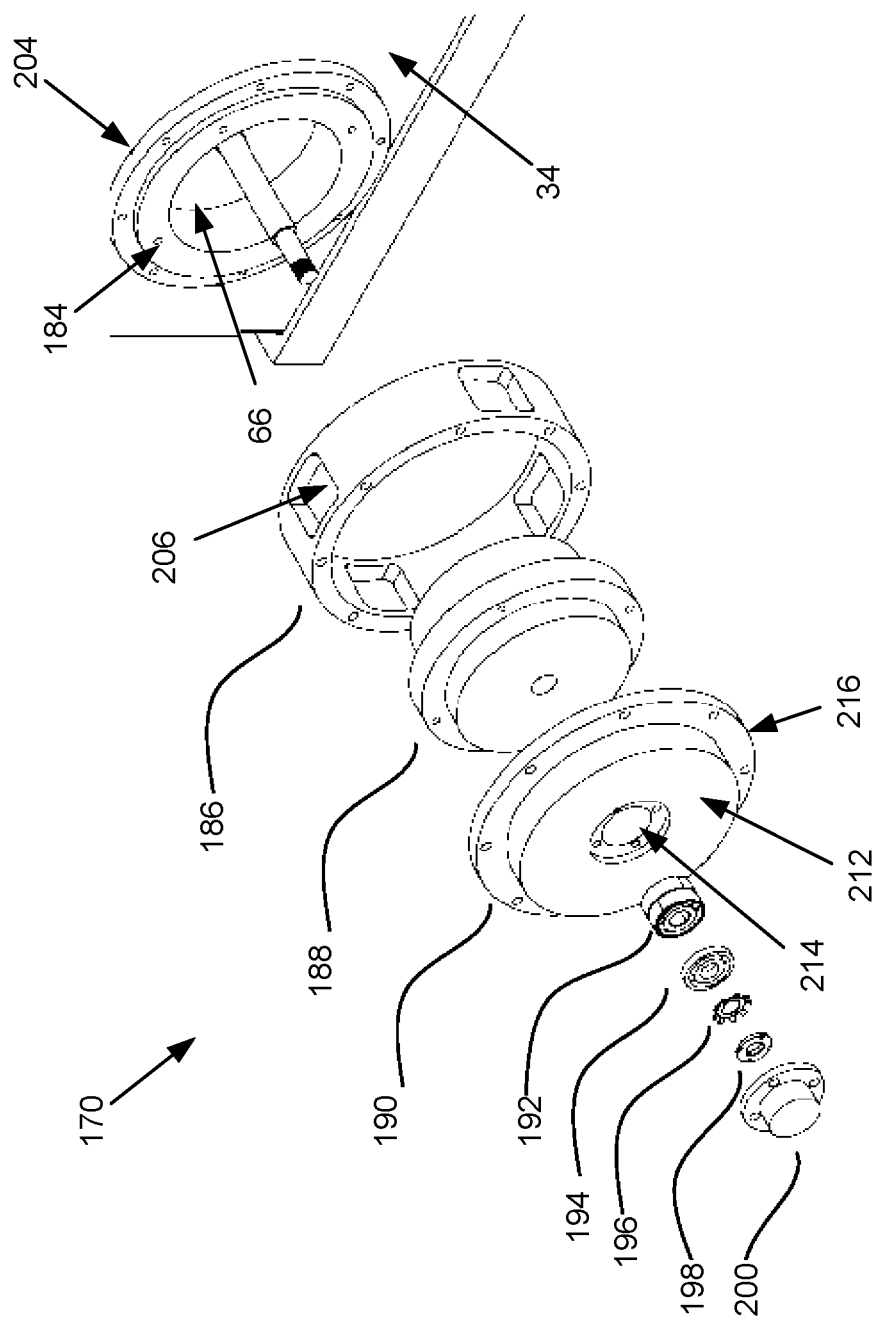
FIG. 7 shows an upper rear left perspective view of enclosure system for producing metallic core-shell particles, in accordance with one or more arrangements; the view showing a close up exploded view of a bearing assembly of the enclosure system.
Figure 8:
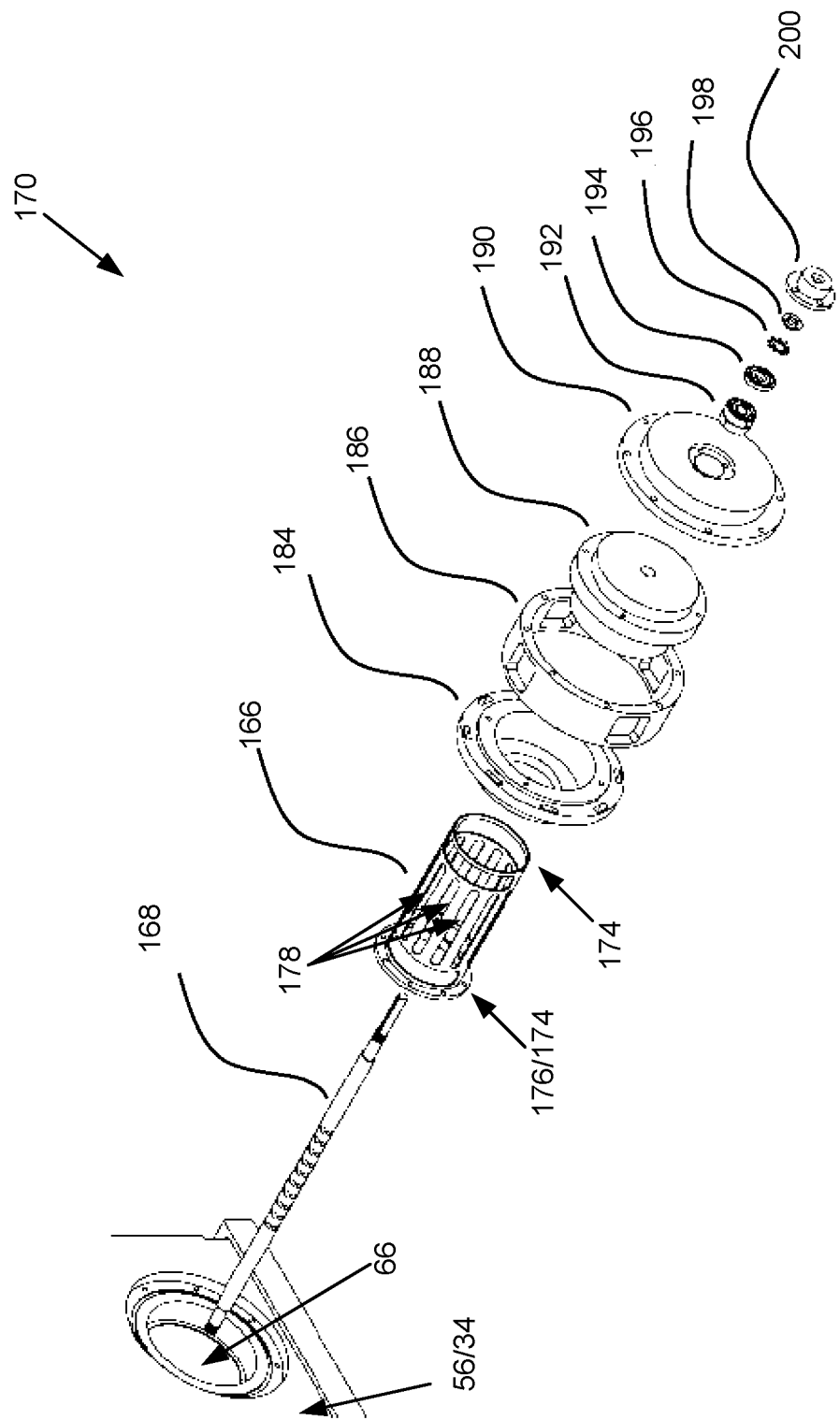
FIG. 8 shows an upper rear right perspective view of enclosure system for producing metallic core-shell particles, in accordance with one or more arrangements; the view showing a close up exploded view of a bearing assembly and a shaft and stator of a shearing assembly of the enclosure system.
Figure 9:
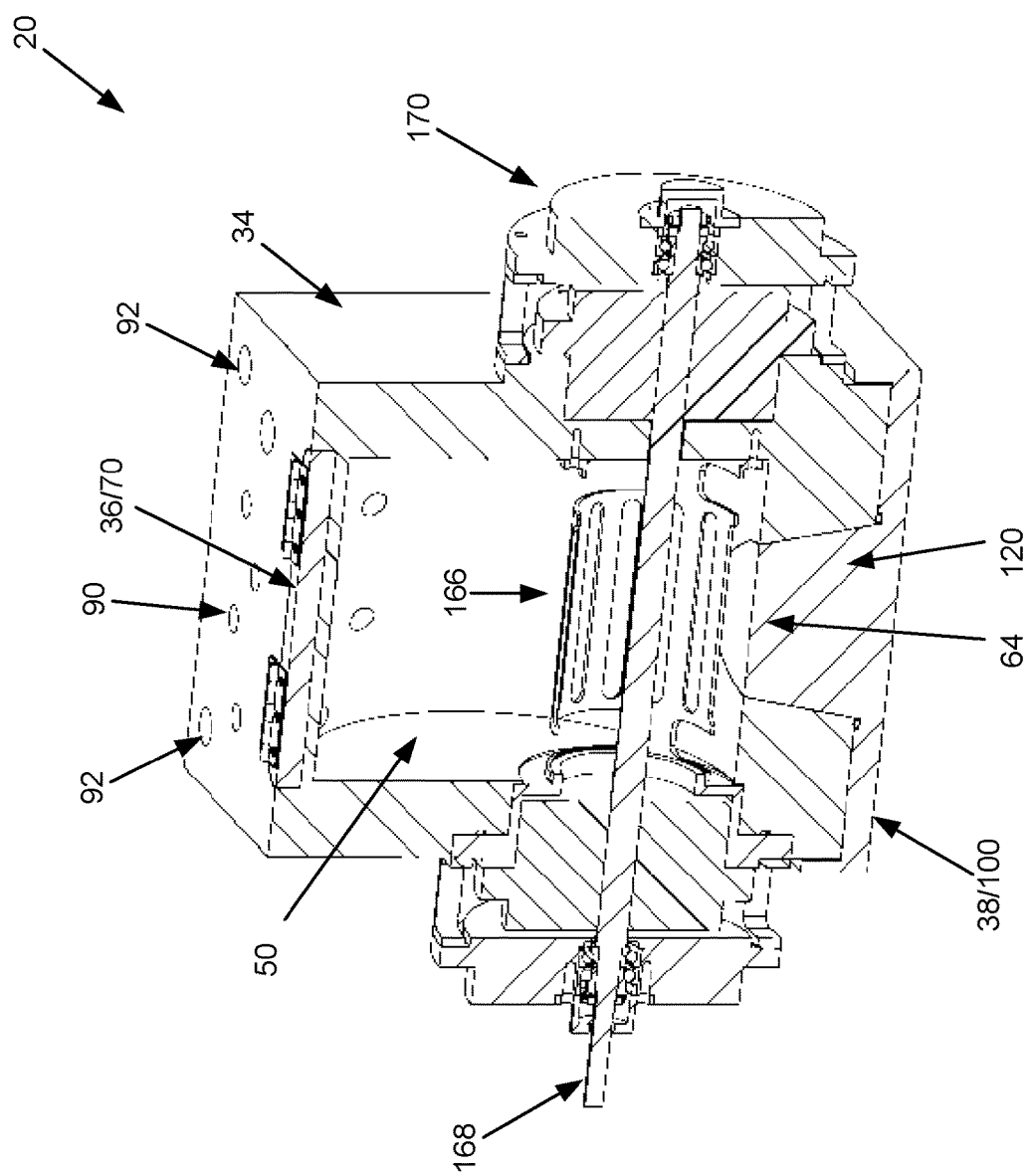
FIG. 9 shows an upper rear right perspective cross sectional view of an enclosure system for producing metallic core-shell particles, in accordance with one or more arrangements; the cross sectional view showing a front half of the enclosure system.
Figure 10:
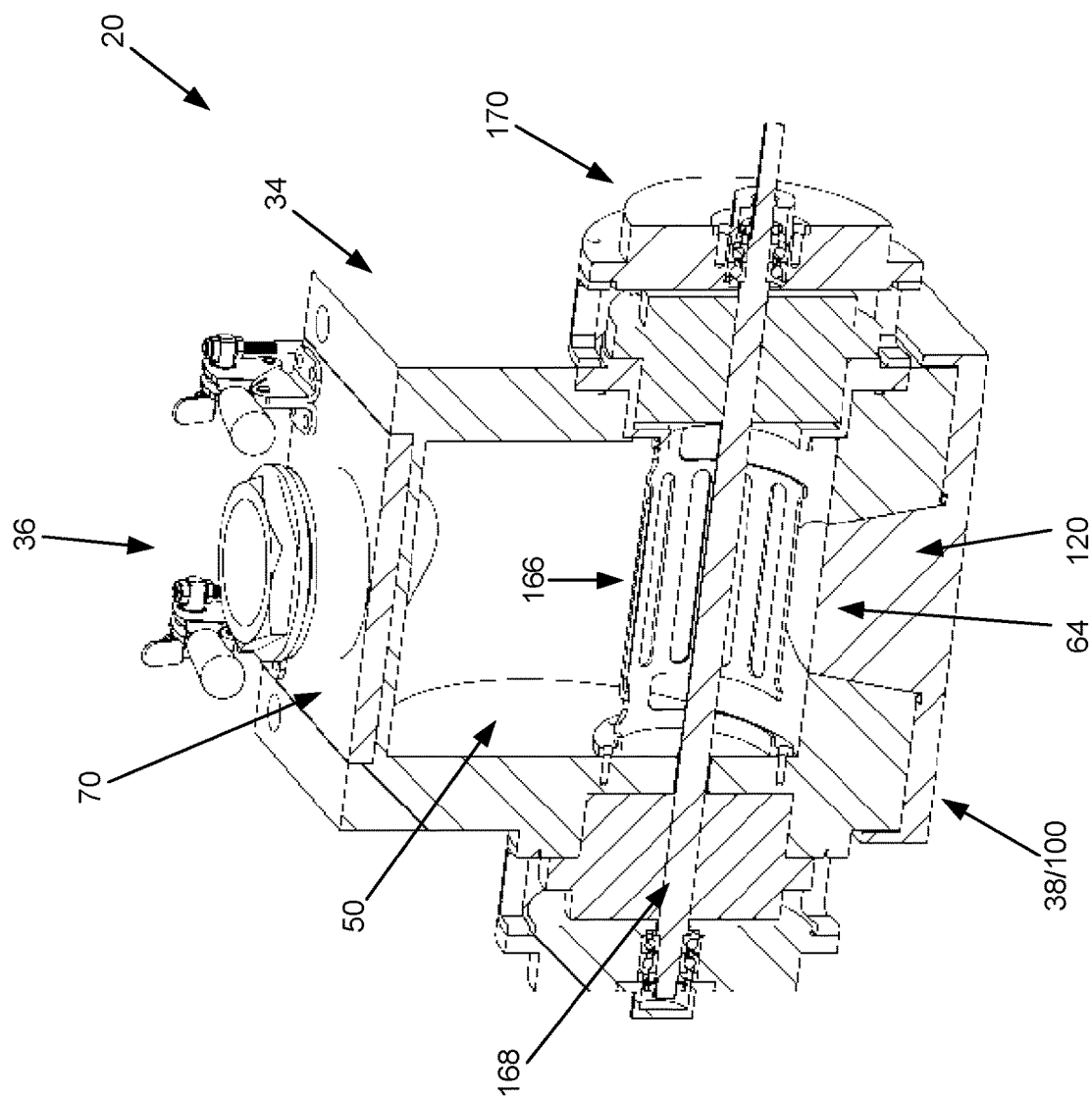
FIG. 10 shows an upper front left perspective cross sectional view of an enclosure system for producing metallic core-shell particles, in accordance with one or more arrangements; the cross sectional view showing a rear half of the enclosure system.
Figure 11:
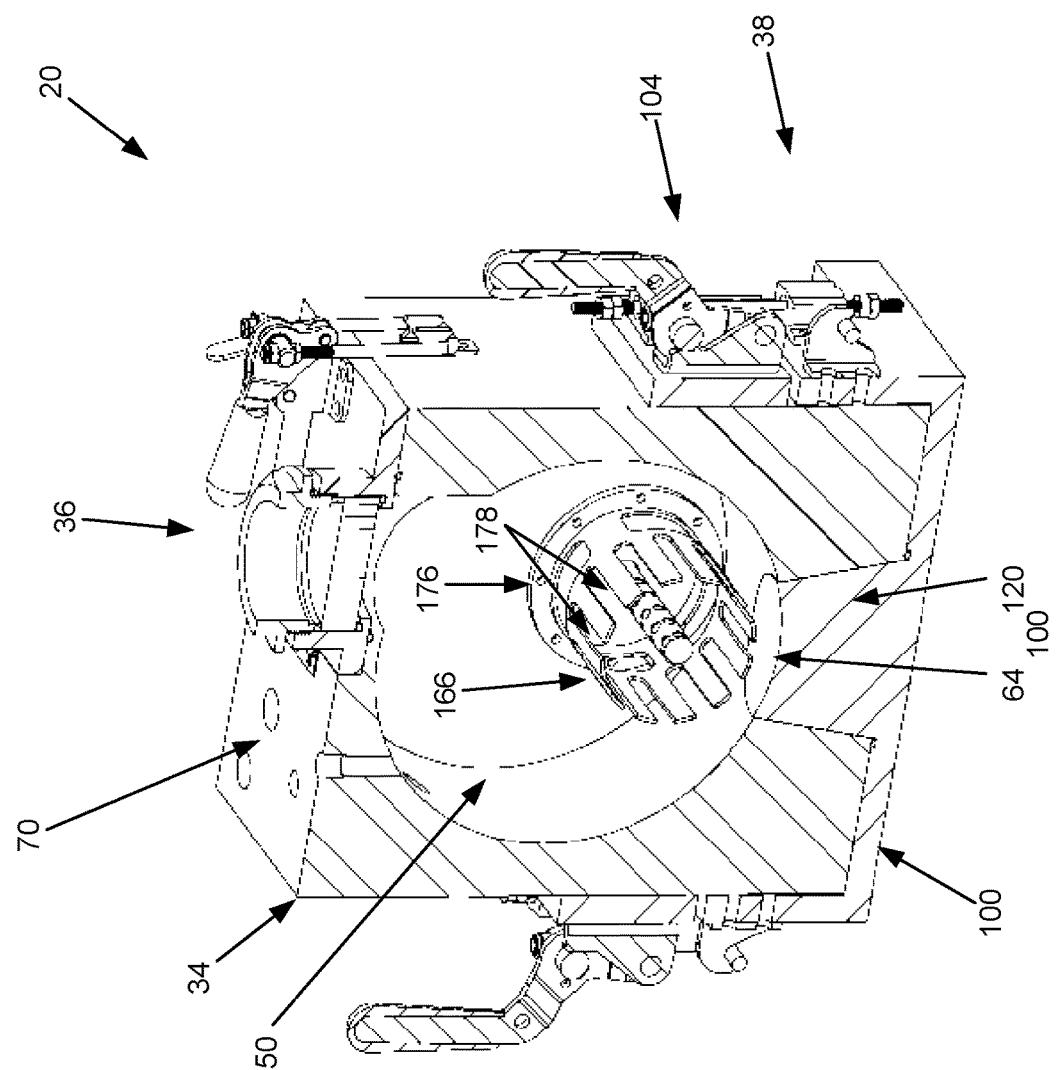
FIG. 11 shows an upper rear left perspective cross sectional view of an enclosure system for producing metallic core-shell particles, in accordance with one or more arrangements; the cross sectional view showing a right portion of the enclosure system.
Figure 12:
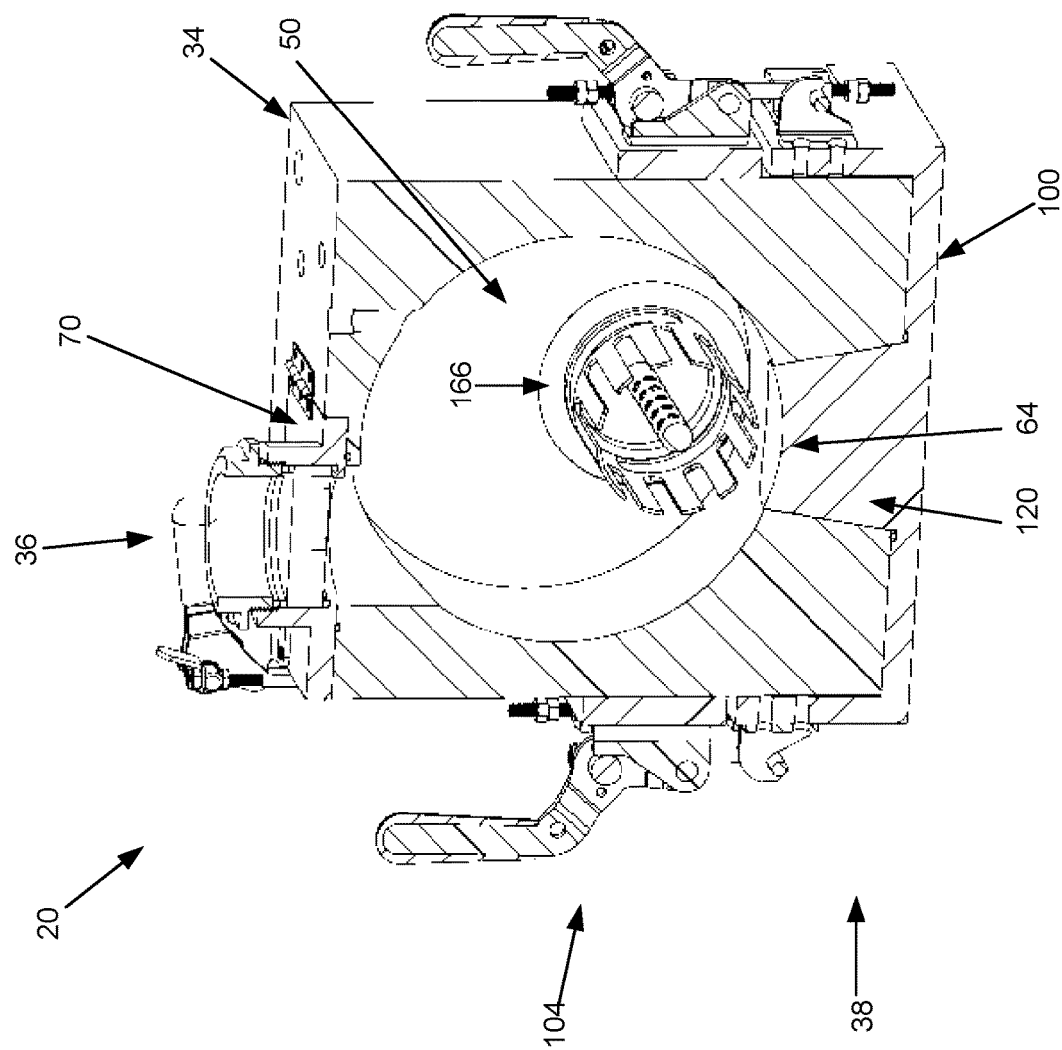
FIG. 12 shows an upper front right perspective cross sectional view of an enclosure system for producing metallic core-shell particles, in accordance with one or more arrangements; the cross sectional view showing a left portion of the enclosure system.
Figure 13:
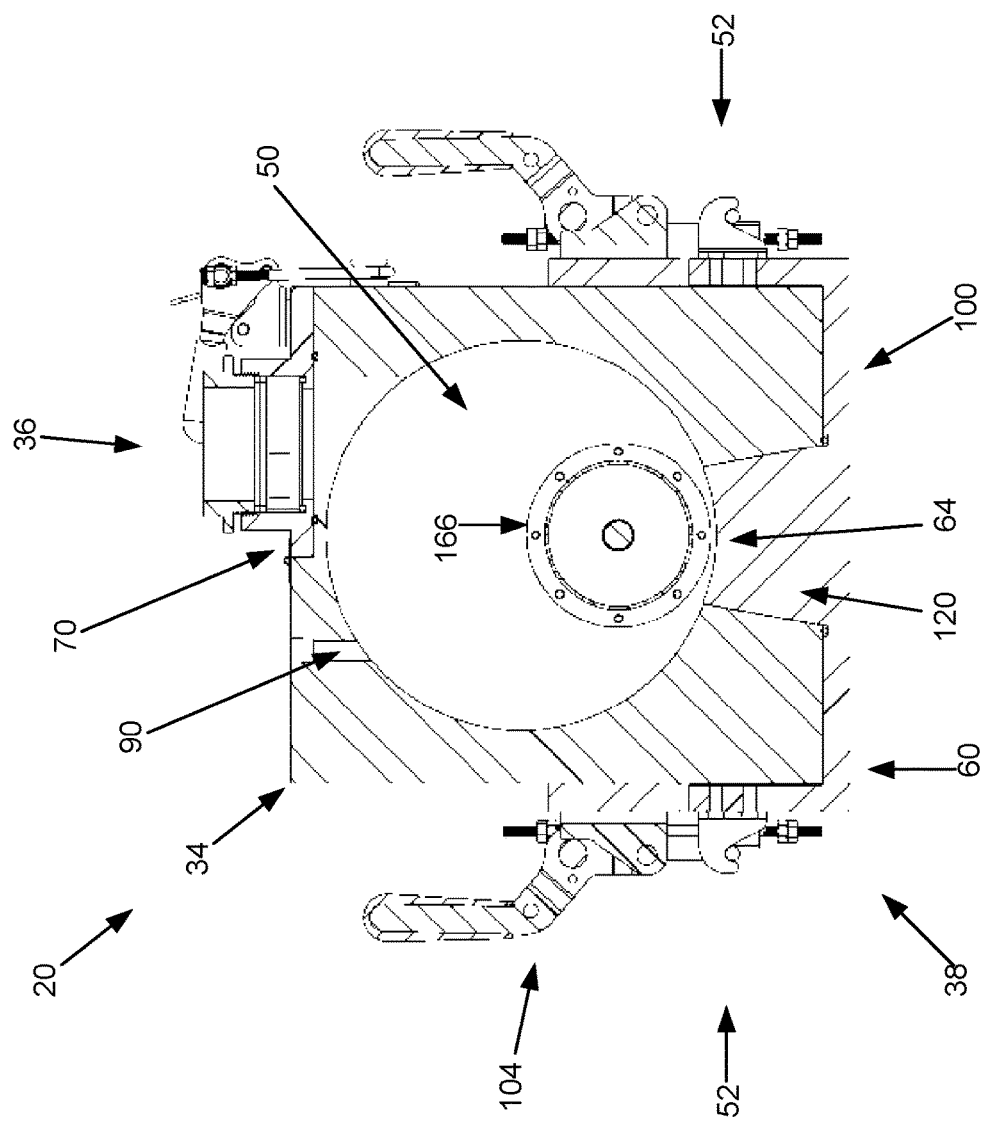
FIG. 13 shows a left side cross sectional view of an enclosure system for producing metallic core-shell particles, in accordance with one or more arrangements; the cross sectional view showing a right half of the enclosure system.
Figure 14:
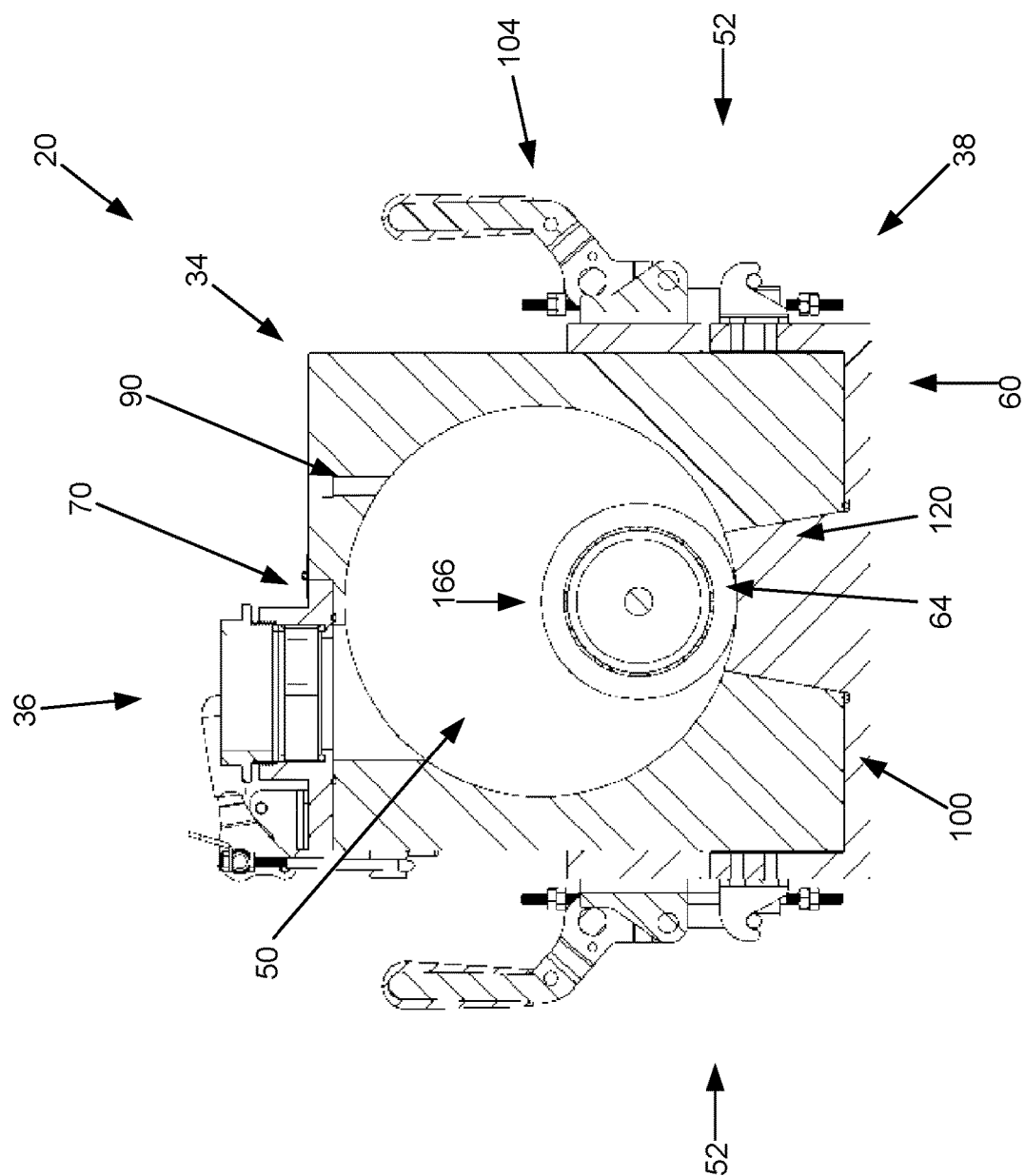
FIG. 14 shows a right side cross sectional view of an enclosure system for producing metallic core-shell particles, in accordance with one or more arrangements; the cross sectional view showing a left half of the enclosure system.
Figure 15:
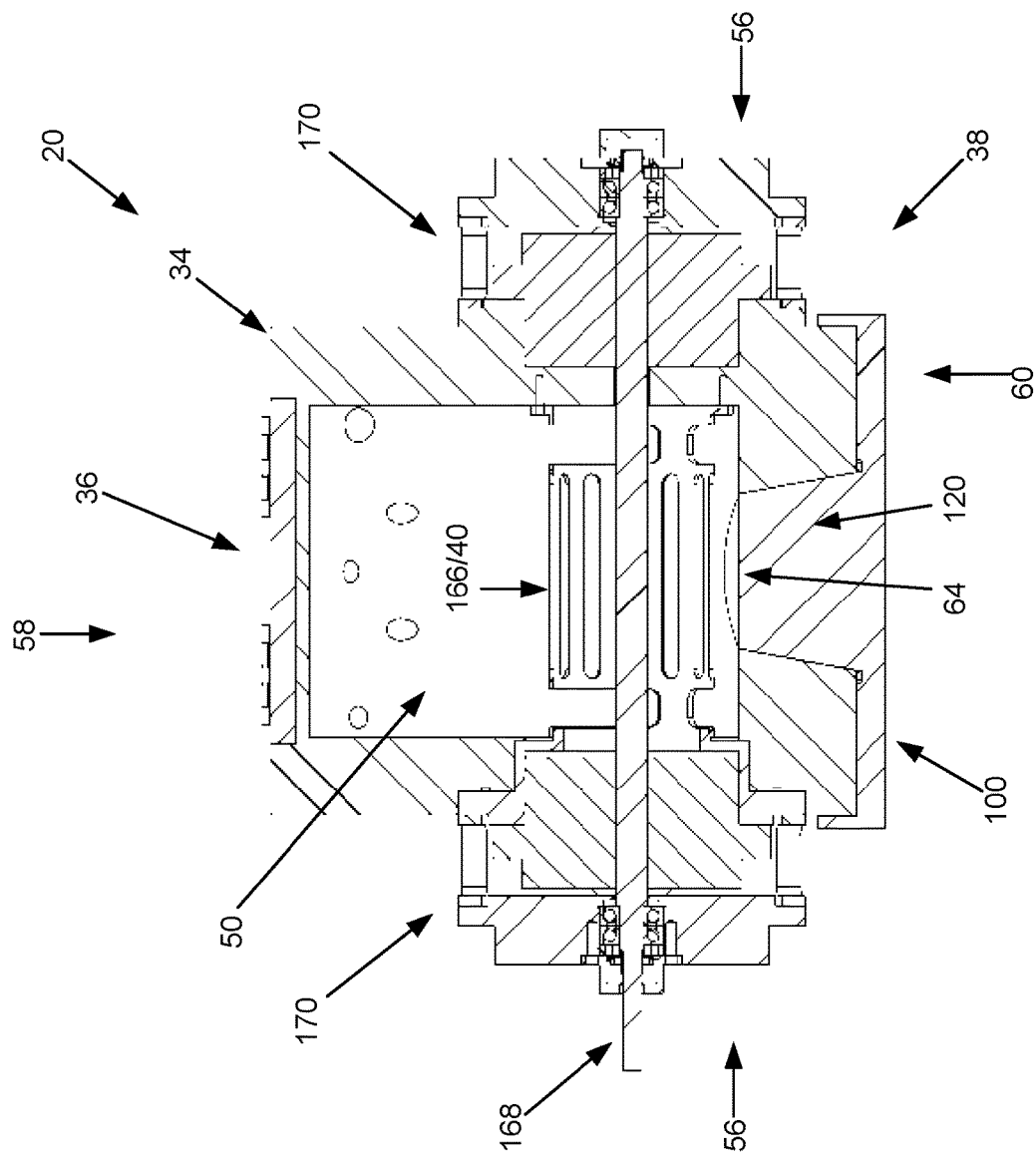
FIG. 15 shows a rear cross sectional view of an enclosure system for producing metallic core-shell particles, in accordance with one or more arrangements; the cross sectional view showing a front half of the enclosure system.
Figure 16:
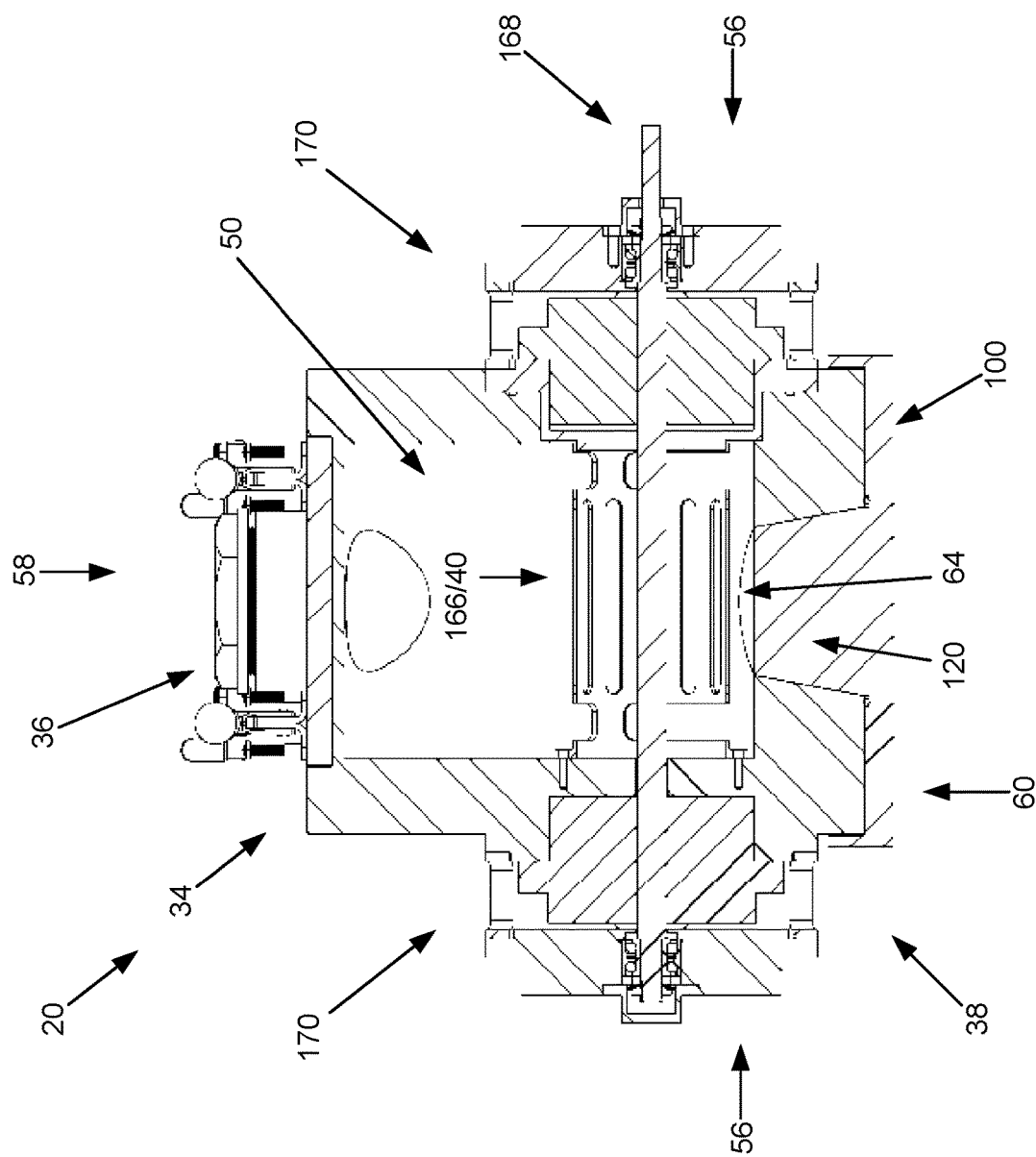
FIG. 16 shows a front cross sectional view of an enclosure system for producing metallic core-shell particles, in accordance with one or more arrangements; the cross sectional view showing a rear half of the enclosure system.
Figure 17:
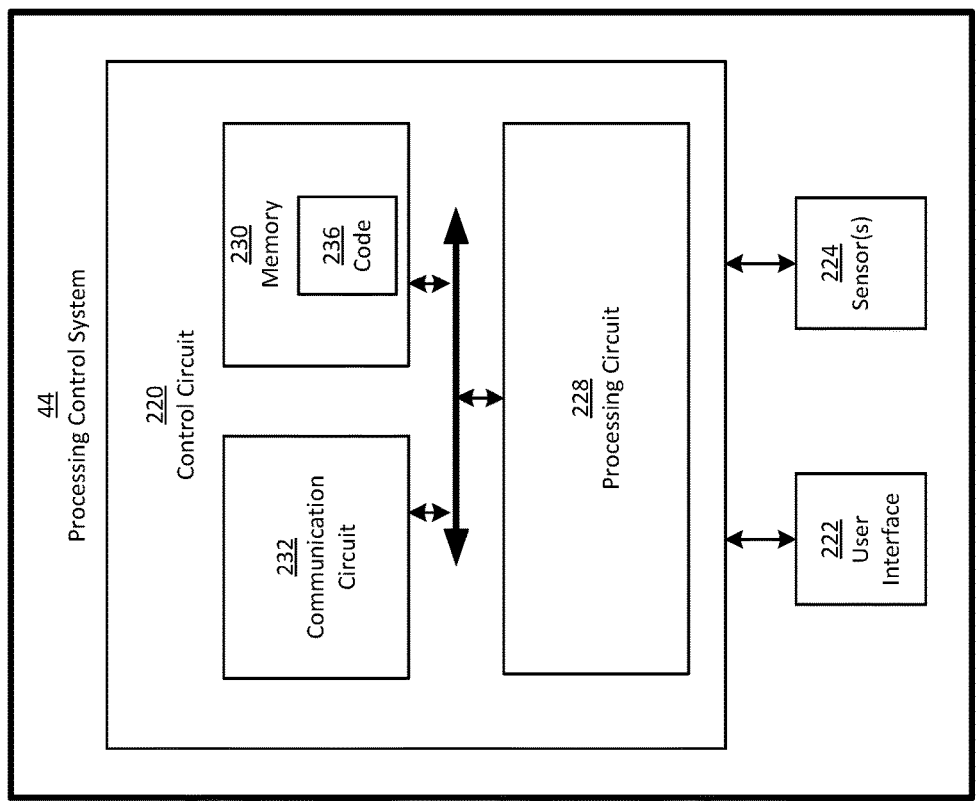
FIG. 17 shows block diagram of a processing control system that may be used for controlling operation of an enclosure system for producing metallic core-shell particles, in accordance with one or more arrangements.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the disclosure. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the disclosure that may be described herein. The contemplated embodiments are not so limited and should not be interpreted as being restricted to embodiments which address such objects of the disclosure. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present disclosure to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of manufacturing undercooled metallic core-shell particles. However, the embodiments are not so limited. It is appreciated that the embodiments may be adapted for use in other applications and/or for manufacture of other items, which may be improved by the disclosed structures, arrangements and/or methods. The system is merely shown and described as being used in the context of manufacturing undercooled metallic core-shell particles for ease of description and as one of countless examples.

System 10:

With reference to the figures, a system for manufacture of undercooled metallic core-shell particles (system 10) is presented. System 10 is formed of components of any suitable size, shape, design, technology, and in any arrangement or configuration to facilitate manufacture of undercooled metallic core-shell particles 12. In an arrangement shown, as one example, system 10 includes an enclosure 20 configured to: contain a molten metal input 28, carrier fluid 30, and reagent inputs 32; separate the molten metal input 28 into particles of a desired size; and form a coating 16 on the particles to facilitate undercooling of a metal core 14 of the particles when ejected from the enclosure 20 and cooled to form the undercooled metallic core-shell particles 12. The undercooled metallic core-shell particles 12 are preserved metastable form of the molten metal input 28. Metastable materials are form of materials that under the right conditions (pressure, temperature, or stimuli) or over time, will transform into a different, lower energy and more stable form of the same material. In the context of this application, one or more arrangements may be used to produce materials having a metastable form, which may include undercooled liquid, glass, higher energy crystal structure(s), semi-crystallinity, short range or long range order, a combination of ordered and disordered regions, or preferential distribution on the surface of the particle i.e. directed spinodal decomposition.

In one or more arrangements, the system further includes input tanks 22 for holding the molten metal input 28, carrier fluid 30 and/or one or more reagents 32, a transfer mechanism 24 connected to the input tanks 22 and enclosure 20, and a cooling tank 26 configured to receive processed materials when ejected from enclosure 20.

Enclosure 20:

Enclosure 20 is formed of components of any suitable size, shape, and design and is configured to contain a molten metal input 28, a carrier fluid 30, and reagent 32; separate the molten metal into particles of a desired size; and form a coating on the particles to facilitate undercooling of a metal core of the particles when ejected from the enclosure 20 and cooled. In the arrangement shown, as one example, enclosure 20 includes a housing 34 having a hollow interior 50, an upper door assembly 36 positioned in a top 58 of the housing 34, a lower door assembly 38 positioned in a bottom 60 of the housing 34, a shearing assembly 40 positioned within the hollow interior 50, and a motor 42 connected to the shearing assembly 40, and a process control system 44, among other components.

Housing 34:

Housing 34 is formed of any suitable size, shape, design and is configured to provide a hollow interior 50 to house shearing assembly 40 and receive and hold molten metal input 28, carrier fluid 30, and reagents 32 for processing. In the arrangement shown, as one example, housing 34 has a front 52, a back 54, sides 56, a top 58, a bottom 60, which form hollow interior 50. In this example arrangement, top 58 has an opening 62, at which upper door assembly 36 is positioned. In this example arrangement, bottom 60 has an opening 64, to which upper door assembly 36 is attached. In this example arrangement, housing 34 has openings 66 in sides 56 through which shearing assembly 40 is installed and positioned.

In one or more arrangements, housing 34 is formed of a corrosive resistant material or corrosion resistant material. The material forming housing 34 may be any material which has a melting temperature that is higher that the melting temperature of the molten metal input 28 and which is resistant to corrosion by the carrier fluid 30 and reagent inputs 32. In some various arrangements, material forming housing 34 may include but is not limited to, for example, stainless steel (e.g., 302, 304, and/or 316), bronze, Durimet, Monel, Hasterloy B, Hastelor C, titanium, cobalt base alloy 6, aluminum, galvanized steel, and/or any other metal or corrosive and heat resistant material. Alternatively, housing 34 may be formed of a ceramic, such as glass or any other ceramic material. Alternatively, housing 34 may have a coating, such as a ceramic coating, a Teflon coating, a plastic coating, etc. on the surface of hollow interior 50 that prevents corrosion. Any other manner of preventing or reducing the corrosion of housing 34 is hereby contemplated for use.

Openings 90:

In the example shown, as one example, housing 34 also includes a set of openings 90 in top 58 for insertion and/or removal of material (e.g., gases and/or fluids) while enclosure 20 is sealed for example to add molten metal input 28, carrier fluids 30, and/or reagent 32, and/or adjust pressure within enclosure 20. In one or more arrangements, valves, fittings, and/or other connectors are attached to openings to facilitate connection of hoses or pipes or other components to openings 90.

Holes 92 & Heating Elements 96:

In the arrangement shown, as one example, housing 34 also includes a set of holes 92 for insertion of heating elements 96 (not shown), which may also be referred to as a temperature control assembly or a temperature control system or similar language that is configured to control the temperature of the housing 34 and/or the temperature of hollow interior 50 of the housing 34. Heating elements 96 are formed of any suitable size, shape, and design and are configured to heat housing 34 and/or hollow interior 50 to a desired temperature during operation. In one or more arrangements, heating elements 96 are electric heating elements (such as block heating elements, electric coils, electric filaments, or the like). However, embodiments are not so limited. Rather, it is contemplated that in one or more arrangements enclosure 20 may be heated using any type of heating system. Furthermore, it is contemplated that in one or more embodiments, enclosure may additionally or alternatively include cooling elements to facilitate cooling of housing 34.

Upper Door Assembly 36:

Upper door assembly 36 is formed of any suitable size, shape, and design and is configured to provide access to hollow interior 50 through opening 62 when open and cover and seal opening 62 when closed. In the arrangement shown, as one example, upper door assembly 36 includes a door 70, hinge members 72 connecting the door 70 to the top 58 of housing 34, a seal 76 positioned between the door 70 and the top 58, and latch mechanisms 74, among other components.

Door 70:

Door 70 is formed of any suitable size, shape, and design and is configured to cover and seal the opening 62 when the upper door assembly 36 is closed. In the arrangement shown, door 70 is generally rectangular shaped and is configured to seat within a corresponding rectangular shaped recess in top 58. However, it is contemplated that in various embodiments door 70 may be any shape. In the arrangement shown, door 70 includes a window 82 positioned at an opening 78 in door 70 for visual inspection of hollow interior 50. In the arrangement shown, door 70 includes a circular flange 80 positioned around opening 78 and extending upward from door 70. In this arrangement, flange 80 has an inner diameter that is slightly larger than a diameter of opening 62. In this arrangement, window 82 is configured to fit snuggly within flange 80 and over door 70. The window 82 is held in place within flange 80 by a threaded cover 86, which is configured to engage threads of flange 80 and clamp window 82 between threaded cover 86 and door 70 when screwed tight. Seals 84 are positioned between door 70 and window 82 and between window 82 and threaded cover 86.

Seals 76 and 84:

Seals 76 and 84 are formed of any suitable any suitable size, shape, design, and materials and are configured to provide an airtight seal when upper door assembly 36 is closed so enclosure 20 may be pressurized. In some various arrangements, seals may be formed of any compressible material that is capable of forming an airtight or nearly airtight seal between components such as rubber, foam, plastic, composite, nylon, neoprene, a poly, or any other compressible material and/or combination thereof.

Hinge Member 72:

In the arrangement shown, hinge members 72 are attached to an upper surface of top 58 of housing 34 and door 70. Hinge members 72 are formed of any suitable size, shape and design and are configured to facilitate hinged attachment of door 70 to top 58. In an arrangement shown, as one example, hinge members 72 are attached to a forward edge of door 70 on opposing sides of opening 78. Alternatively, in one or more arrangements hinge members 72 may be omitted and door 70 may be held in place by latch mechanisms 74 or another means for connecting door to top 58 including but not limited to, rivets, pins, clamps, bolts, screws, adhesives, chemical bonding, and/or any other process or means that results in a permanent or semi-permanent connection.

Latch Mechanism(s) 74:

Latch mechanism(s) 74 are formed of any suitable size, shape, and design and are configured to hold door 70 in a closed position, at which an airtight or nearly airtight seal of opening 62 is provided, when latched and release door 70 from the closed position when unlatched. In various embodiments, latch mechanism(s) 74 may be implemented using various mechanisms including but not limited to, for example, cam latches, compression latches, toggle latches, clamp latches, slam latches, draw latches, sliding latches, over center latches, snaps, clips, hooks, hasps, catches, and/or other type of fastener. In the arrangement shown, latch mechanism(s) 74 are clamp latches configured to press door 70 downward against top 58 to compress seal 76 between door 70 and top 58 to provide an airtight or nearly airtight seal of opening 62.

Lower Door Assembly 38:

Lower door assembly 38 is formed of any suitable size, shape, and design and is configured to provide access to hollow interior 50 through opening 64 when open and cover and seal opening 64 when closed. In the arrangement shown, as one example, lower door assembly 38 includes a door 100 and latch assembly 104, among other components.

Door 100:

Door 100 is formed of any suitable size, shape, and design and is configured to cover and seal the opening 64 when the lower door assembly 38 is closed. In the arrangement shown, door 100 has a generally rectangular planar shape extending between a forward edge 110, a rearward edge 112, and opposition side edges 114. In this example arrangement, door 100 has a flange 116 extending upward from the forward edge 110, rearward edge 112, and side edges 114. In this example arrangement, the bottom 60 of housing 34 is configured to fit within flange 116 when door 100 is raised to a closed position.

In the arrangement shows, door 100 includes a plug 120 extending upward from a center of door 100. Plug 120 is formed of any suitable size, shape, and design and is positioned and configured to be inserted into and mate with opening 64 when door 100 is raised to the closed position, thereby plugging opening 64. In the arrangement shown, as one example, plug has a conical shaped side 122 and a top 124 that is configured to be flush with a lower interior surface of the hollow interior 50 of housing 34 when door 100 is raised to the closed position.

In the arrangement shown, door 100 has a seal 126 positioned on an upper surface of door around plug 120. Seal 126 is formed of any suitable any suitable size, shape, design, and materials and is configured to provide an airtight or nearly airtight seal between door 100 and bottom 60 of housing 34 when door 100 is raised to the closed position. In some various arrangements, seal 126 may be formed of any compressible material that is capable of forming an airtight or nearly airtight seal such as rubber, foam, plastic, composite, nylon, neoprene, a poly, or any other compressible material and/or combination thereof.

In the arrangement shown, door 100 includes a set of drain holes 128. Drain holes 128 are formed of any suitable size, shape, and design and are configured to facilitate passage of fluid exiting enclosure 20 from opening 64 through drain holes 128. In the arrangement shown, door 100 includes four arc shaped drain holes 128 positioned around plug 120. However, embodiments are not so limited. Rather, it is contemplated that door 100 may have any number of drain holes 128 with any type of shape.

In the arrangement shown, door 100 includes upper flange portions 132 extending upward from flange 116 at forward edge 110 and rearward edge 112 of door 100. Upper flange portions 132 are formed of any suitable size, shape, and design and are configured to facilitate connection of door 100 to latch assembly 104.

Latch Assembly 104:

Latch assembly 104 is formed of any suitable size, shape, and design and is configured to facilitate latching and unlatching of door 100 to and from the closed position and raising and lowing of door 100 between the closed position to the open position. In the arrangement shown, as one example, latch assembly 104 includes mounting blocks 136, latch mechanisms 138, and slide assemblies 140.

Mounting Blocks 136: In the arrangement shown, mounting blocks 136 attached to the front 52 and back 54 of housing 34. Mounting blocks 136 are formed of any suitable size, shape, and design and are configured to facilitate attachment of latch mechanisms 138 and slide assemblies 140 to housing 34. In the arrangement shown, as one example, mounting blocks 136 are have a generally rectangular planar shape and are aligned with upper flange portions 132 of door 100. In various arrangements, mounting blocks 136 may be attached to housing 34, latch mechanisms 138, and/or slide assemblies 140 using various processes and means including, for example, welding, rivets, pins, clamps, bolts, screws, adhesives, chemical bonding, and/or any other process or means that results in a permanent or semi-permanent connection.

Latch Mechanisms 138: Latch mechanisms 138 are formed of any suitable size, shape, and design and are configured to hold door 100 in the closed position when latched and release door from the closed position when unlatched. In various embodiments, latch mechanism(s) 138 may be implemented using various mechanisms including but not limited to, for example, cam latches, compression latches, toggle latches, clamp latches, slam latches, draw latches, sliding latches, over center latches, snaps, clips, hooks, hasps, catches, and/or other type of fastener. In the arrangement shown, latch mechanisms 138 are clamp latches, similar to latch mechanisms 74, and are configured to pull door 100 upward against bottom 60 to compress seal 126 between door 100 and bottom 60 to provide an airtight seal of opening 64.

Slide Assemblies 140: Slide Assemblies 140 are formed of any suitable size, shape, and design and are configured to provide a sliding connection between door 100 and housing 34 that permits door 100 to slide between the open and closed positions. In the arrangement shown, as one example, slide assemblies 140 include slide brackets 144, slide bolts 146, and nuts 148. Slide brackets 144 are formed of any suitable size, shape, and design and are configured to providing sliding connection between slide bolts and upper flange 132 and mounting blocks 136. In the arrangement shown, as one example, slide bracket 144 has a body 152, a slide hole 154 extending vertically through body 152, and flanges 156 extending outward from the sides of a rearward end of body 152. In this example arrangement, flanges 156 have holes 158 to facilitate attachment of slide bracket 144 to mounting blocks 136 and/or upper flange portions 132 of door 100, for example, by bolts or screws. However, embodiments are not so limited. Rather, it is contemplated that slide bracket 144 may be attached to mounting blocks 136 and/or upper flange portions 132 of door 100 using various processes and means including, for example, welding, rivets, pins, clamps, bolts, screws, adhesives, chemical bonding, and/or any other process or means that results in a permanent or semi-permanent connection.

In this example arrangement, each slide assemblies 140 includes an upper slide bracket 144 attached to mounting block 136, a lower slide bracket 144 attached to upper flange portion 132 of door 100, and a slide bolt 146 extending though the slide holes 154 of the upper and lower slide brackets. Nuts 148 are threaded onto ends of slide bolts 146 to hold slide bolt 146 in slide holes 154 while permitting door 100 to slide up and down between the open and closed positions.

Although arrangements are primarily described with reference to enclosure 20 having upper door assembly 36 positioned in top 58 and lower door assembly 38 positioned in bottom 60, the embodiments are not so limited. Rather, it is contemplated that enclosure may have door assemblies positioned at any location of enclosure to provide access to hollow interior 50 for insertion and/or removal of materials (e.g., molten metal input 28, carrier fluid 30, and/or reagent(s) 32). Additionally or alternatively, it is contemplated that in one or more arrangements, door assemblies (e.g., 36 and 38) may be omitted and materials (e.g., molten metal input 28, carrier fluid 30, and/or reagent(s) 32) inserted and/or removed from hollow interior 50 of enclosure 20 via one or more openings 90 and/or valves, fittings, and/or other connectors are attached thereto.

Shearing Assembly 40:

In the arrangement shown, enclosure 20 includes shearing assembly 40 positioned within housing 34. Shearing assembly 40 is formed of any suitable size, shape, and design and is configured to separate the molten metal input 28 in contents of enclosure into smaller particles of a desired size. In the arrangement shown, as one example, shearing assembly 40 rotatable shaft 168, a set of impellers 164 attached to the rotatable shaft 168, a stator 166 in proximate position to the impellers, and a bearing and seal assembly 170. When the shaft 168 and impellers 164 are rotated, the impellers 164 and stator 166 interact with contents 28/30/32 of enclosure 20 to shear particles of molten metal input 28, suspended in carrier fluid 30 and reagent 32, into particles of the desired size.

In the arrangement shown, as one example, shearing assembly 40 is positioned at a lower end of hollow interior 50 of housing 34. In this position, shearing assembly 40 is able to contact contents 28/30/32 of enclosure 20 when smaller batches are processed. In this position, interactions between the interior surface and shearing assembly 40 may also assist in shearing of metal input 28 to the desire size.

Figure 22:
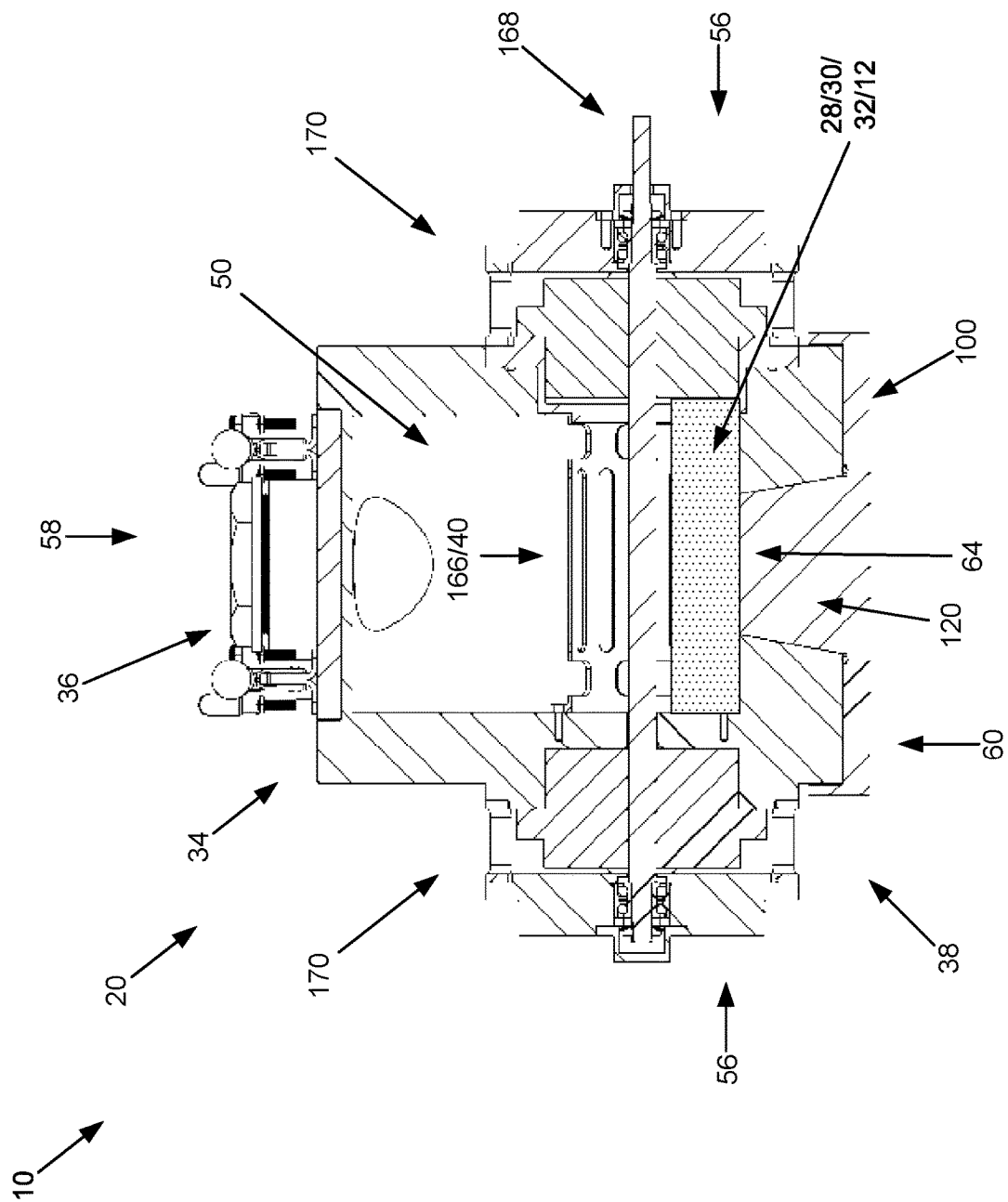
FIG. 22 shows a front cross sectional view of an enclosure system for producing metallic core-shell particles, in accordance with one or more arrangements; the cross sectional view depicting inputs within the enclosure system for producing metallic core-shell particles.
Figure 23:
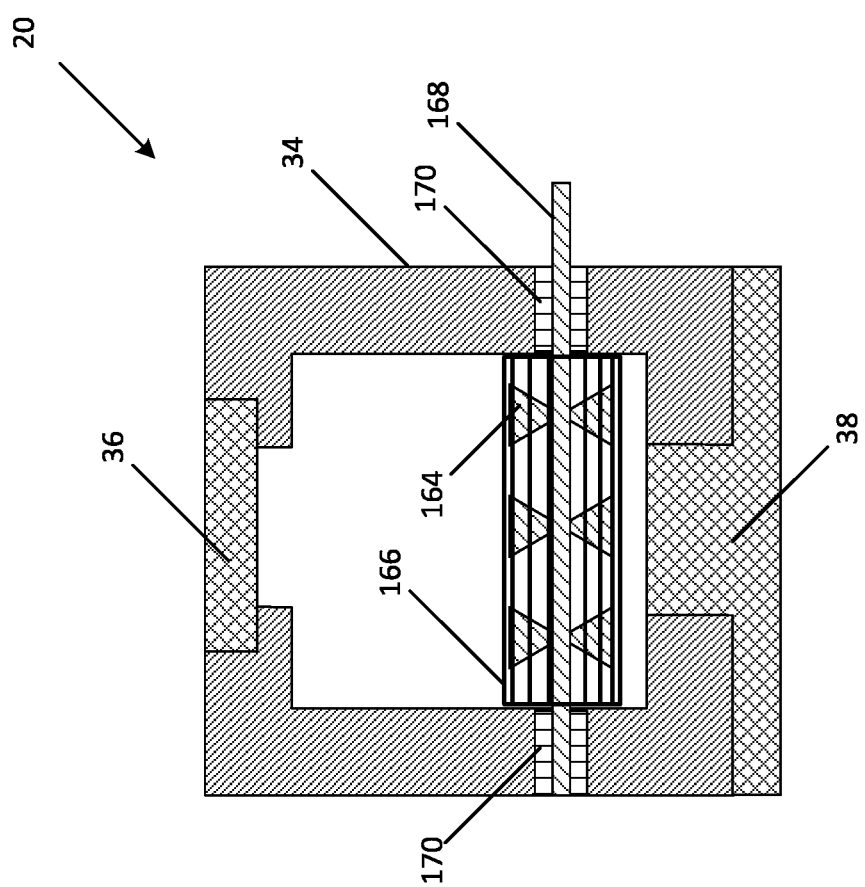
FIG. 23 shows a front cross sectional view of an enclosure system for producing metallic core-shell particles, in accordance with one or more arrangements; the view showing the enclosure system configured with an upper door assembly and lower door assembly for production of metallic core-shell particles in batches.
Figure 24:
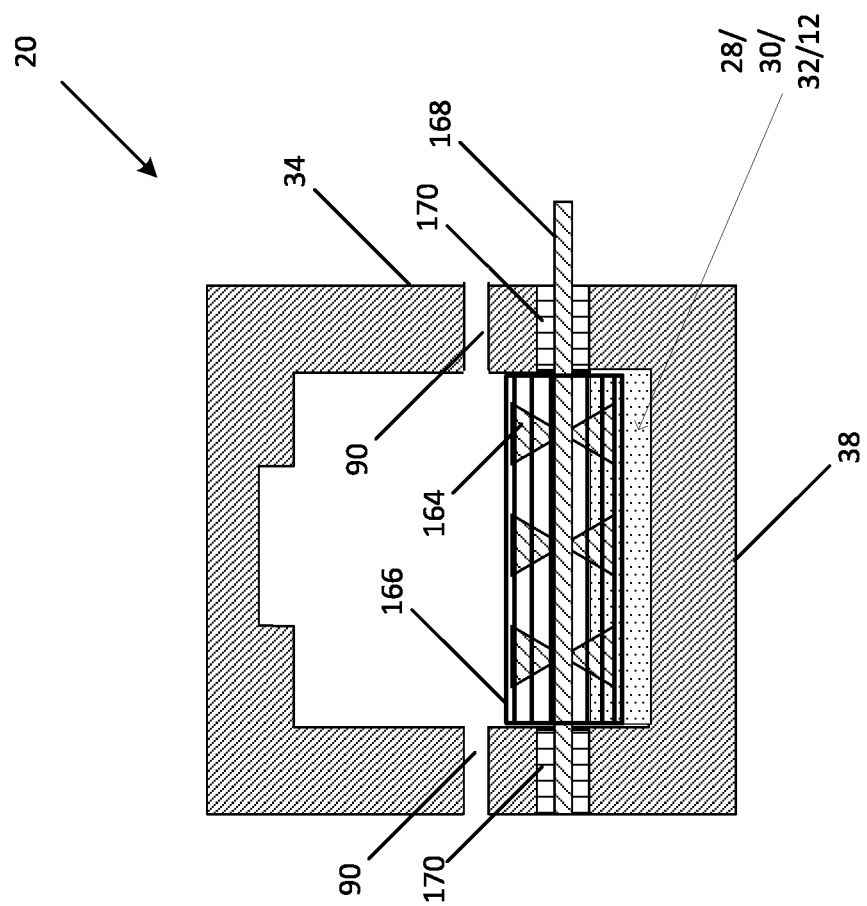
FIG. 24 shows a front cross sectional view of an enclosure system for producing metallic core-shell particles in a continuous flow process, in accordance with one or more arrangements.

In various arrangements, system may be used to process batches of various sizes. In the arrangement shown in FIGS. 22 and 24, for example, contents 28/30/32 fill approximately ¼ of the hollow interior 50 of housing 34. However, embodiments are not so limited. Rather, it is envisioned that hollow interior 50 of housing 34 may be filled with a greater or lesser amount so long as there remains a headspace for an appropriate amount of gaseous reagents.

Stator 166:

Stator 166 is formed of any suitable size, shape, and design and is configured to direct the flow of contents inside of enclosure 20 when impellers 164 are rotated to facilitate shearing of motel metal input 28. In the arrangement shown, as one example, stator 166 has the general shape of an elongated cylindrical tube extending between opposing ends 174. In this example arrangement, stator 166 has a diameter sufficient to permit impellers 164 and shaft 168 to be positioned within stator 166. In this example arrangement, stator 166 has a circular flange 176 extending outward at one of the ends 174. The circular flange 176 is configured to facilitate attachment of stator 166 to housing 34. In various arrangements, circular flange 176 of stator 166 may be attached to housing 34 using various processes and means including, for example, welding, rivets, pins, clamps, bolts, screws, adhesives, chemical bonding, and/or any other process or means that results in a permanent or semi-permanent connection. In the arrangement shown, stator 166 has slots 178 positioned around the circumference of the stator 166. In this example arrangement, slots 178 extend along the length of the stator 166. Slots 178 permit fluids to move into and out of stator 166 when impellers 164 are rotated and facilitate shearing of molten metal input 28.

Impellers 164:

Impellers 164 are formed of any suitable size, shape, and design and are configured to induce flow of contents 28/30/32 of enclosure 20 when rotated and to shear particles of molten metal input 28, suspended in carrier fluid 30 and reagent 32, into particles of the desired size. Various different arrangements may use various different types of impellers 164 including but not limited to, for example, open impellers, semi-closed impellers, closed or shrouded impellers, flexible impellers, and/or any other type of impeller. Such impellers 164 may be configured for axial flow, radial flow, right hand rotation, left hand rotation, and/or any combination of these and other configurations of impellers 164.

Baffles 172:

In one or more arrangements, one or more baffles 172 may be positioned inside of enclosure 20. Baffles 172 are formed of any suitable size, shape, and design and is configured to direct the flow of contents inside of enclosure 20 when impellers 164 are rotated. Baffles may be configured, for example, to direct contents away from openings 90 and holes 92 of enclosure during operation. In the arrangement shown, as one example, baffles have generally planar rectangular shaped extending inward from an interior wall of enclosure. In this example arrangement, baffles 172 includes holes 173 to permit limited flow of contents through baffles 172. However, it is contemplated that, in some various arrangements, baffles may have any other shape and may be positioned differently than shown herein. In some arrangements, baffles 172 are removable. Such arrangement permits a user to customize flow of contents during operation as needed with little adjustment to enclosure 20. Bearing and Seal Assembly 170:

Bearing and seal assembly 170 is formed of any suitable size, shape, and design and is configured to connect with and hold shaft 168 and impellers 164 in the hollow interior 50 of housing 34 with shaft extending outward from opening 66 in a side 56 of housing, while permitting smooth rotation of shaft 168 and also sealing openings 66 to provide an airtight or nearly airtight seal. In the arrangement shown, as one example, bearing and seal assembly 170 includes, for each opening 66 of housing 34, a seal centering member 184, a positioning brace member 186, a seal 188, a bearing centering lid 190, bearings 192, a shim 194, a washer 196, a nut 198, and a cover 200, among other components.

Seal Centering Member 184:

Seal centering member 184 is formed of any suitable size, shape, and design and is configured to fit in opening 66 and connect with housing 43 and facilitate positioning of seal 188. In the arrangement shown, as one example, seal centering member 184 as a cylindrical tube shape with an exterior end having a flange 204 that extends outward from the center. Circular flange 204 is configured to facilitate connection with outer surface of housing 34. In various arrangements, circular flange 204 of seal centering member 184 may be attached to housing 34 using various processes and means including, for example, welding, rivets, pins, clamps, bolts, screws, adhesives, chemical bonding, and/or any other process or means that results in a permanent or semi-permanent connection. In this example arrangement, seal centering member 184 has an inside diameter configured to receive and hold seal 188.

Positioning Brace Member 186:

Positioning brace member 186 is formed of any suitable size, shape, and design and is configured to attach to seal centering member 184 and contain seal 188 therein. In the arrangement shown, as one example, positioning brace member 186 has cylindrical tube shape having one end connected to circular flange 204 of seal centering member. In various arrangements, positioning brace member 186 may be attached to seal centering member 184 using various processes and means including, for example, welding, rivets, pins, clamps, bolts, screws, adhesives, chemical bonding, and/or any other process or means that results in a permanent or semi-permanent connection. In this example arrangement, positioning brace member 186 has a set of openings 206 to facilitate connection of nitrogen gas inlet outlet system 208 to bearing 192. In the arrangement shown, positioning brace member 186 has four openings 206. However, embodiments are not so limited. Rather it is contemplated that in one or more arrangements, positioning brace member 186 may have a greater or fewer number of openings 206.

Seal 188:

Seal 188 is formed of any suitable size, shape, and design and is configured to providing a seal between seal centering member 184 and shaft 168 in opening 66. In various different arrangements, seal 188 may be implanted using various different types of seals including but not limited to, for example, packing seals, lip seals mechanical seals, single seals, double seals, tandem seals, cartridge seals, gas seals, and/or any other type of seal. In the arrangement shown, seal 188 is a gas seal. Gas seals are non-contacting seals with faces designed to be pressurized using an inert gas as a barrier instead of traditional lubricating liquid. Seal faces are separated or held in loose contact during operation by adjusting the gas pressure. In one or more arrangements, seal 188 is supplied with nitrogen gas during operation by nitrogen gas inlet outlet system 208.

Bearing Centering Lid 190:

Bearing centering lid 190 is formed of any suitable size, shape, and design and is configured to attached to positioning brace member 186, hold seal 188 in seal centering member 184, and hold bearings 192 in proper position. In the arrangement shown, as one example bearing centering lid 190 generally has a circular disc shaped body 212 with a cylindrical hole 214 in the center and a circular flange 216 extending outward from a peripheral edge of the body 212. Flange 216 is configured to facilitate attachment to positioning brace member 186. In various arrangements, flange 216 of bearing centering lid 190 may be attached to positioning brace member 186 using various processes and means including, for example, welding, rivets, pins, clamps, bolts, screws, adhesives, chemical bonding, and/or any other process or means that results in a permanent or semi-permanent connection.

Bearings 192

Bearings 192 are positioned and held within cylindrical hole 214 of bearing centering lid 190. Bearings 192 are formed of any suitable size, shape, and design and are configured to hold and center shaft 168 and while facilitating smooth rotation of shaft 168. In various different arrangements, bearings 192 may be implemented using various different types of bearings including but not limited to, for example, rolling element bearings such as ball bearings or roller bearings, plane bearings, fluid bearings, gas bearings, hydrostatic bearings, magnetic bearings, and/or any other type of bearing.

In the arrangement shown, each bearing 192 is held within cylindrical hole 214 of bearing centering lid 190 by a shim 194, a washer, and a nut 198 threaded onto shaft 168. With a nut 198 threaded onto each end of shaft 168, shaft 168 is held in place during operation. However, embodiments are not so limited. Rather, it is contemplated that one or more arrangements may utilize various alternative connectors to bearings 192 is held within cylindrical hole 214 and hold shaft 168 in place including but not limited to, for example, linchpins, cotter pins, wire lock pins, other types locking pins, screws, bolts, clamps, and/or any other means or method to facilitate connection to shaft 168. In this example arrangement, cover 200 is fitted over shim 194, a washer, and a nut 198.

Motor 42:

In the arrangement shown, a motor 42 is connected to a portion of shaft 168 that extends through bearings 192 and cover 200 of one side of enclosure 20. Motor 42 is formed of any suitable size, shape and design and is configured to generate mechanical movement. In the arrangement shown, as one example, motor 42 is an electric motor (e.g., a DC motor or an AC motor) configured to convert electric power into rotational motion. However, embodiments are not so limited. For example, in some arrangements, motor 42 may be an internal combustion engine, a fluid driven engine (e.g., steam, water, and/or air driven), or any other type of motor or engine. In the arrangement shown, a drive shaft of motor 42 is operatively connected to and is configured to rotate shaft 168 when operated. In one or more arrangements, speed of motor 42 is adjustable to facilitate adjustment of the speed at which impellers 164 are rotated during operation, for example to adjust the size of the particles 12 that are produced. In one or more various arrangements, speed of motor 42 may be adjusted to facilitate production of undercooled metallic particles of various sizes ranging from the millimeter scale down to nanometer scale. In one or more arrangements are thought to be particularly useful for efficient production of undercooled metallic particles in the range of 50 nanometers to 500 micrometers. Additionally or alternatively, in one or more arrangements, system 10 may be adjusted to control particle size distribution, and shape (e.g., spherical or ellipsoidal).

Pressure Control Assembly:

In the example shown, housing 34 also includes a pressure control assembly or pressure control system (not shown) for controlling the pressure (or vacuum) within hollow interior 50 of housing 34. In one arrangement, pressure control assembly is configured to inject gasses into hollow interior 50 of housing 34 (or conversely to suck gasses out of hollow interior 50 of housing 34) thereby controlling the pressure within hollow interior 50 of housing 34. Pressure control assembly may inject atmospheric air or a specific gas or mixture of gasses (such as oxygen, carbon dioxide, nitrogen, inert gasses, reactive gasses, or any other gas or mixture thereof to accomplish the optimum performance of the system 10). In one arrangement, pressure control system is a controllable source of pressurized air that is pumped into hollow interior 50 of housing 34. In one arrangement, pressure control system may control the pressure within hollow interior 50 of housing 34 to ambient pressure.

Processing Control System 44:

In one or more arrangements, system 10 includes a processing control system 44. Processing control system 44 is formed of any suitable any suitable size, shape and design and is configured to control one or more environmental factors within enclosure while seals. In one or more arrangements, such environmental factors may include but are not limited to, for example temperature, pressure, rotational speed of impellers, processing time, and/or input or release of gaseous, liquid, and/or solid matter to or from enclosure 20. For example, in one or more arrangements, processing control system 44 is configured to provide adjustment of pressure in enclosure 20 from atmospheric pressure up to 1000 PSI. As another example, in one or more arrangements, processing control system 44 is configured to provide adjustment of temperature withing enclosure 20 between 0° C.-350° C. In one example arrangement shown, processing control system 44 includes a control circuit 220, user interface 222, and/or sensors 224.

Control Circuit 220:

Control circuit 220 is formed of any suitable size, shape, design, technology, and in any arrangement and is configured to control operation of other components of processing control system 44 to facilitate triggering of user customized actions in response to signals of sensors 224. Sensors may include but are not limited to, for example, pressure sensors, temperature sensors, chemical sensors (e.g., PH sensors), flow rate sensors, and/or any other type of sensor. In the arrangement shown, as one example implementation, processing control system 44 control circuit 220 includes a processing circuit 228 and memory 230 having software code 236 or instructions that facilitates the computational operation of processing control system 44. Processing circuit 228 may be any computing device that receives and processes information and outputs commands according to software code 236 or instructions stored in memory 230.

Memory 230 may be any form of information storage such as flash memory, ram memory, dram memory, a hard drive, or any other form of memory. Processing circuit 228 and memory 230 may be formed of a single combined unit. Alternatively, processing circuit 228 and memory 230 may be formed of separate but electrically connected components. Alternatively, processing circuit 228 and memory 230 may each be formed of multiple separate but electrically connected components.

Software code 236 or instructions is any form of information or rules that direct processing circuit 228 how to receive, interpret and respond to information to operate as described herein. Software code 236 or instructions is stored in memory 230 and accessible to processing circuit 228. As an illustrative example, in one or more arrangements, software code or instructions may configure processing circuit 228 of processing control system 44 to control motor 42 and/or heating elements 96 in holes 92 of enclosure 20 in response to user input received via user interface 222 and/or data received from sensors 224.

Communication Circuit 232:

Communication circuit 232 is formed of any suitable size, shape, design, technology, and in any arrangement and is configured to facilitate communication with devices to be controlled, monitored, and/or alerted by processing control system 44. In one or more arrangements, as one example, communication circuit 232 is a includes a transmitter (for one way communication) or transceiver (for two way communication). In various arrangements, communication circuit 232 may be configured to communicate with various components of system 10 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, WiMax, Bluetooth, Bluetooth low energy, UltraWideband (UWB), 802.15.4/ZigBee, ZWave, GSM/EDGE, UMTS/

HSPA+/HSDPA, CDMA, LTE, FM/VHF/UHF networks, and/or any other communication protocol, technology or network.

User Interface 222:

User Interface is formed of any suitable size, shape, design, technology, and in any arrangement and is configured to facilitate user control and/or adjustment of various components of system 10. In one or more arrangements, as one example, user interface 222 includes a set of inputs 240. Inputs 240 are formed of any suitable size, shape and design and are configured to facilitate user input of data and/or control commands. In various different arrangements, inputs 240 may include various types of controls including but not limited to, for example, buttons, switches, dials, knobs, a keyboard, a mouse, a touch pad, a touchscreen, a joystick, a roller ball, or any other form of user input. Optionally, in one or more arrangements, user interface includes a display 242 (not shown). Display 242 is formed of any suitable size, shape, design, technology, and in any arrangement and is configured to facilitate display information of settings, sensor readings, time elapsed, and/or other information pertaining to processing of materials in enclosure 20. In one or more arrangements, display 242 may include, for example, LED lights, meters, gauges, screen or monitor of a computing device, tablet, and/or smartphone. Additionally or alternatively, in one or more arrangements, the inputs 240 and/or display may be implemented on a separate device that is communicatively connected to processing control system 44. For example, in one or more arrangements, operation of processing control system 44 may customized using a smartphone or other computing device that is communicatively connected to the processing control system 44 (e.g., via Bluetooth, WIFI, and/or the internet).

Figure 18:
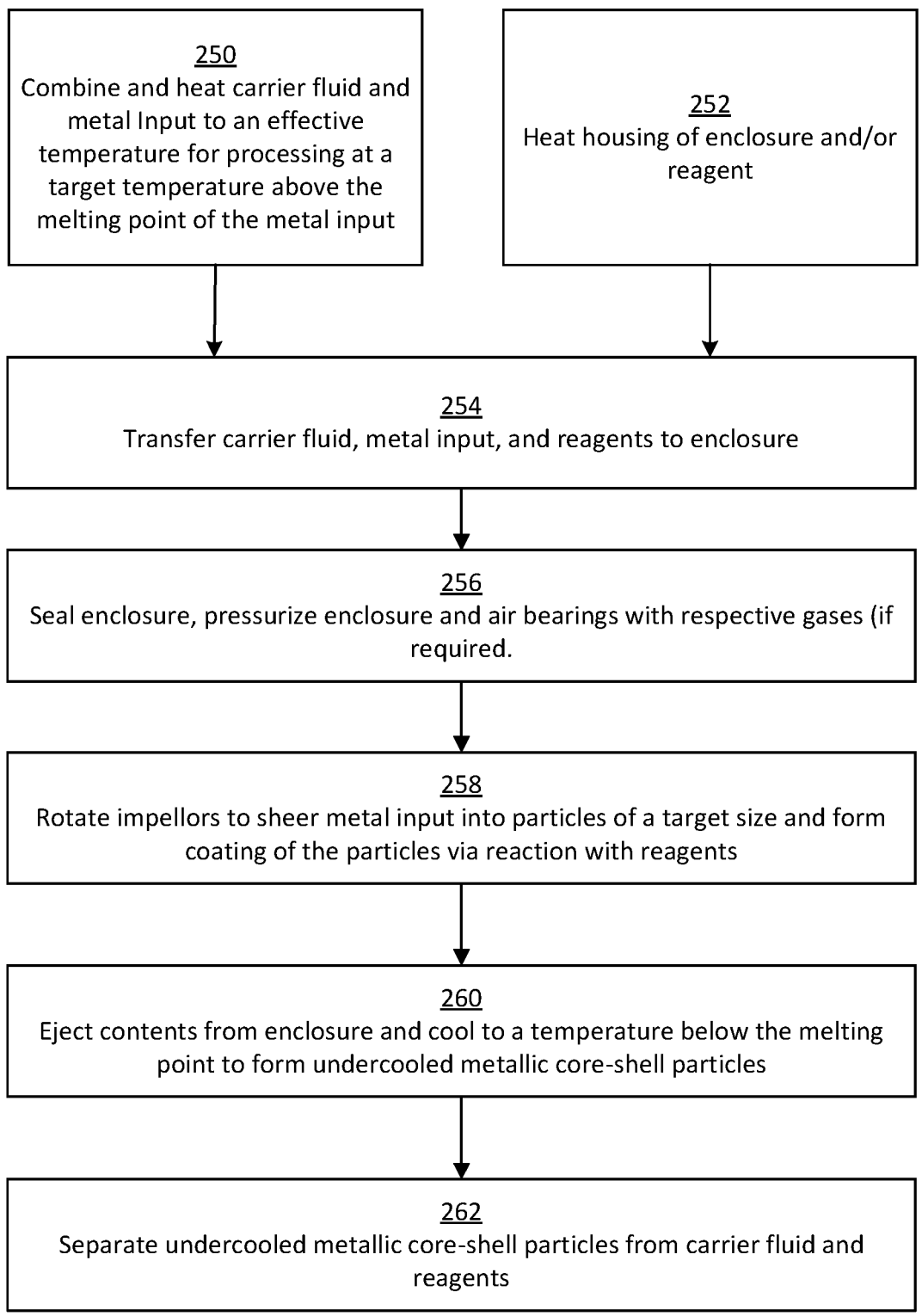
FIG. 18 shows a flow chart of an example process for producing metallic core-shell particles, in accordance with one or more arrangements.

In Operation:

In one example application, system 10 may be used for manufacture of undercooled metallic core-shell particles 12. FIG. 18 shows an example process for production of undercooled metallic core-shell particles using system 10. At process block 250, metal input 28 and carrier fluid 30 are heated to an effective temperature. As used herein, effective temperature refers to a temperature of the metal input 28 and carrier fluid 30, which causes combined contents of enclosure 20 to be at a desired processing temperature once all inputs (e.g., metal input 28, carrier fluid 30, and reagents 32) have been added to enclosure 20, enclosure 20 is sealed, and temperatures equalize. It is recognized that the effective temperature at which metal input 28 and carrier fluid 30 are heated to will depend on the mass of the metal input 28 and carrier fluid 30 relative to temperatures and mass of other inputs (e.g. reagents 32) and of the enclosure 20 prior to adding the inputs. Optionally, in one or more arrangements, housing 34 of enclosure 20 and/or reagent 32 may be heated at process block 252.

At process block 254, metal input 28, carrier fluid 30, and reagents 32 are transferred into enclosure 20. In various different arrangements, metal input 28, carrier fluid 30, and/or reagents 32 may be transferred to enclosure 20 through upper door assembly 36, openings 90 in top 58 of enclosure 20 or any other opening in enclosure 20. In various different arrangements, metal input 28, carrier fluid 30, and/or reagents 32 may be transferred to enclosure 20 manually by hand (e.g., via pouring) or using a transfer mechanism 24.

At process block 256, enclosure 20 is sealed. In one or more arrangements, enclosure 20 and/or bearings may be pressurized by gases at process block 256.

Figure 19:
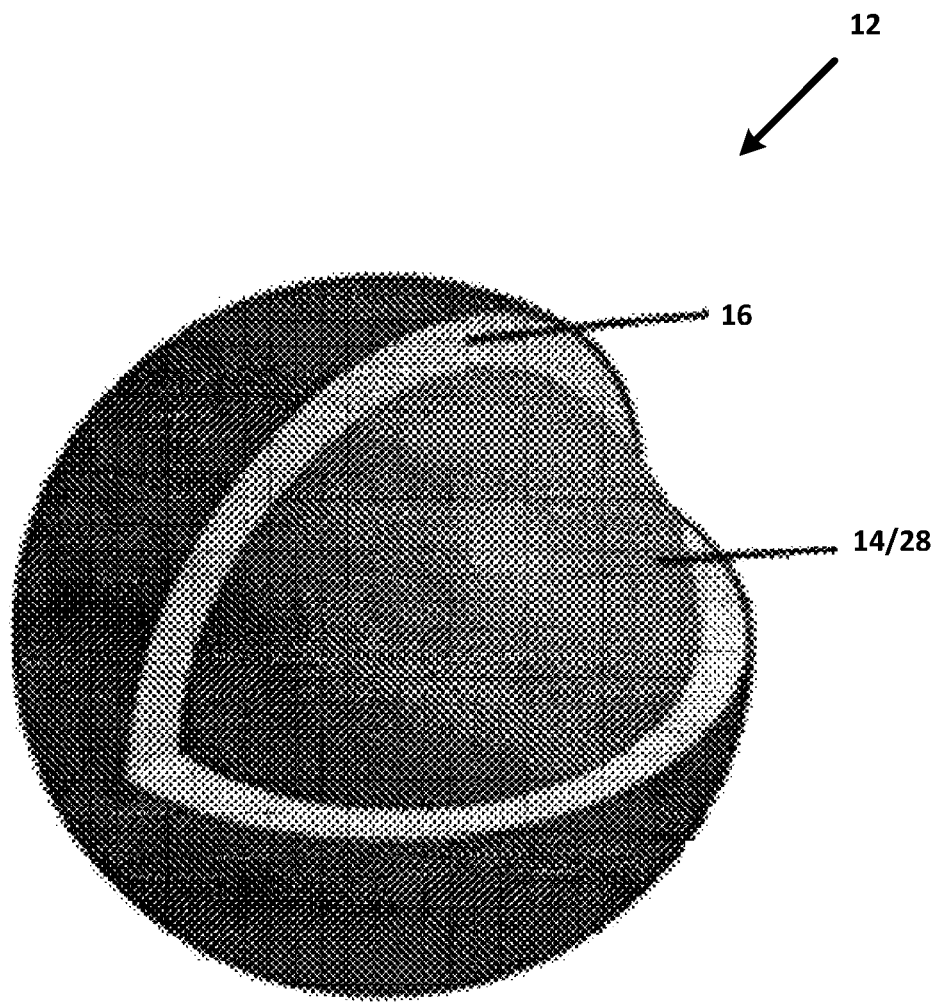
FIG. 19 shows a perspective view of a metallic core-shell particles, in accordance with one or more arrangements; the view showing a portion of the shell omitted.
Figure 20:
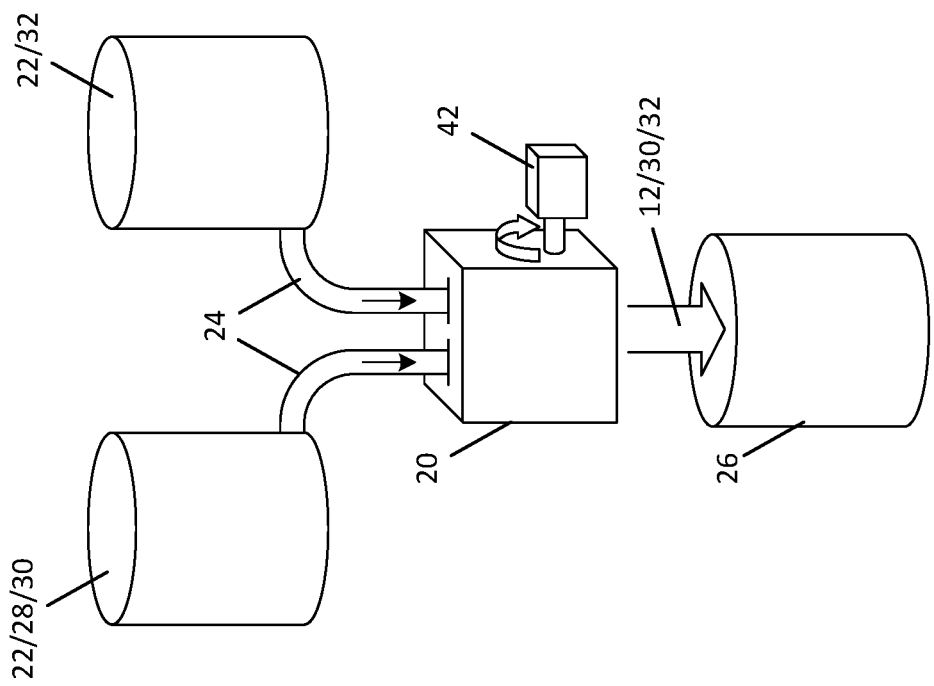
FIG. 20 shows a diagram of an enclosure system for producing metallic core-shell particles, in accordance with one or more arrangements.
Figure 21:
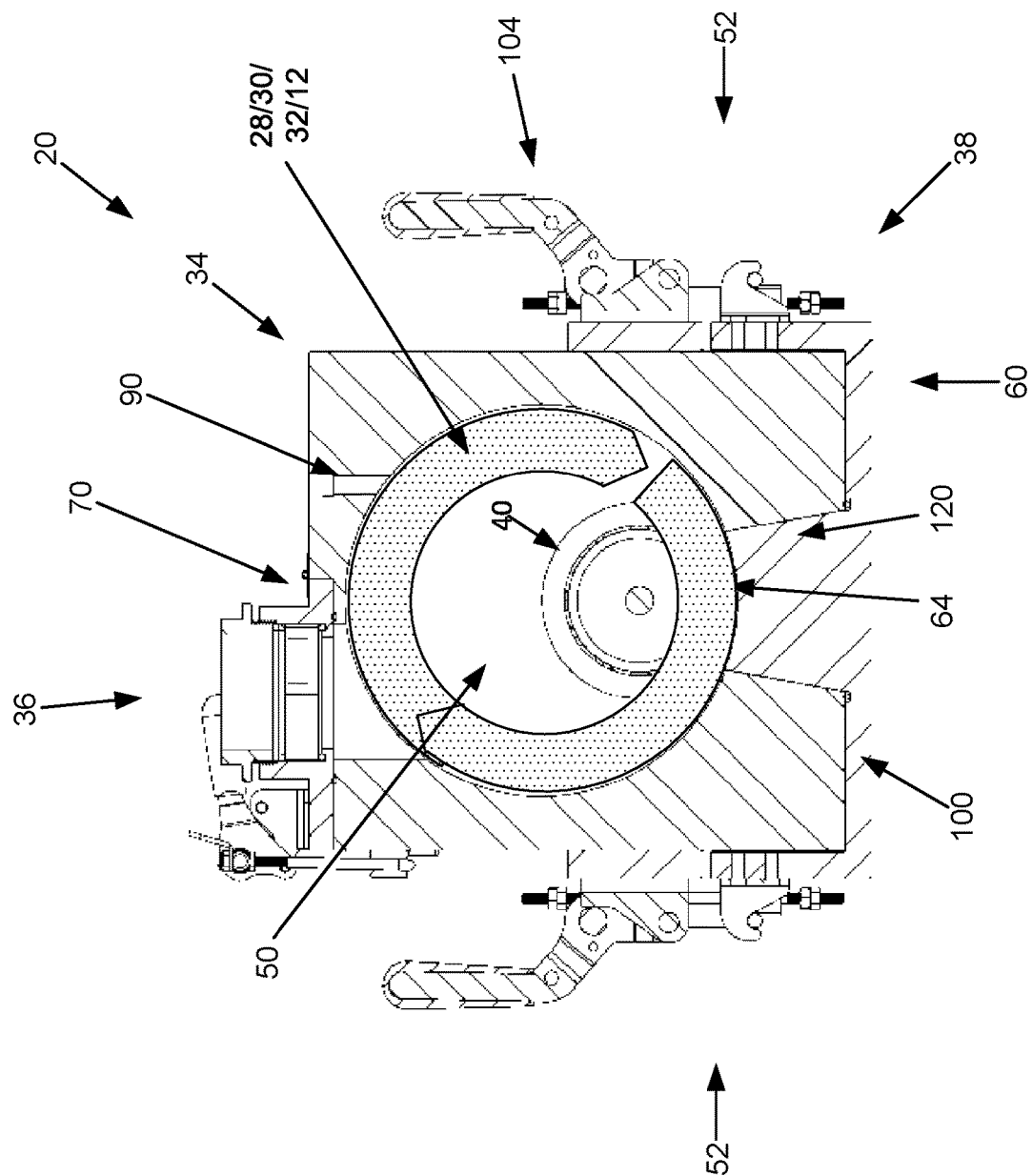
FIG. 21 shows a right side cross sectional view of an enclosure system for producing metallic core-shell particles, in accordance with one or more arrangements; the cross sectional view depicting flow of inputs within the enclosure system in the process of producing metallic core-shell particles.

At process block 258, impellers 164 are rotated to shear the molten metal input 28 into particles of target size and place the particles in contact with reagents 32 to form a coating 16 on the particles, for example as illustrated in FIG. 19.

At block 260, contents of the enclosure 20 are ejected from enclosure 20, e.g., by lowering lower door assembly 38. When lower door assembly 38 is lowered, plug 120 is removed from opening 64 permitting contents of enclosure to flow through opening 64, through drain holes 128 in lower door assembly 38 into a cooling tank 26. As the coated particles of metal input 28 in the contents are cooled below melting/freezing temperature, coating 16 causes core 14 formed of the metal input 28 to remain in a molten state, thereby forming undercooled metallic core-shell particles 12.

It is recognized that the temperatures, pressures, and processing times, depend on the metal input, reagents, used to produce core-shell particles and the target particle size. Processes and components of some example metallic core-shell particles are described in U.S. Pat. No. 10,266,925 titled "STABLE UNDERCOOLED METALLIC PARTICLES FOR ENGINEERING AT AMBIENT CONDITIONS", which is hereby fully incorporated by reference herein.

BiSn Cores, Melting Point 139° C.

As one illustrative example, in one or more embodiments, metallic core-shell particles 12 are created using bismuth-tin (BiSn) for metal input 28 and a carrier fluid 30 (e.g., diethylene glycol) containing a 10% excess of reagents 32 (e.g., polyacrylic acid and oxygen). However, the embodiments are not so limited. Rather, it is contemplated that the prosses may adapted facilitate undercooling of any type of metal. Similarly, it is contemplated that in various arrangements, the process may use adapted to use various alternative or additional reagents (e.g., acids, bases, and/or gases) to facilitate formation of coating 16 over particles.

In an example process, for this BiSn example, a liter of carrier fluid 30 and reagents 32 is introduced into the enclosure 20 of the equipment and is slowly heated to 160° C. In this example, an ingot of eutectic bismuth tin solder weighing 1 kg total is added to the hot liquid in enclosure 20 and equilibrated for 10 minutes.

In one or more arrangements, bearings 192 and/or seal 188 are pressurized to 50 psi with nitrogen, the enclosure 20 is sealed, and the enclosure 20 is pressurized to 48 psi with an appropriate gas (e.g., air for a 20% $O_2$ environment, or a mixture of $O_2$ and an inert carrier where a different partial pressure is needed). The pressure differential leads to a flow of gas out of the enclosure 20 and into a vented system.

In one or more arrangement, the shearing assembly 40 is turned on to 20,000 RPM and the molten metal BiSn is sheared into microcapsules. In this example, the BiSn metal input 28 is sheared for approximately 90 seconds to shear the BiSn metal input 28 into particles. During this processing, the polyacrylic acid and oxygen react with BiSn particles 14 to form a polyacrylic acid metal oxide coating 16 thereon in situ. After this time, in this example, the air pressure to the enclosure 20 is decreased followed by reduction of the nitrogen pressure to the until they are both off. In this example, the upper door assembly 36 on top of enclosure 20 is then opened to air. In this example, the lower door assembly 38 is then opened to release and drop the suspension of coated molten BiSn particles into cooling tank 26 (or other collection vessel) and allowed to cool. In this example, the cooled suspension is then filtered (e.g., by separation system 270) to recover the clean supercooled liquid metal microcapsules.

SAC305 Cores, Melting Point 220° C.

As another illustrative example, in one or more embodiments, metallic core-shell particles 12 are created using SAC305 (a lead-free alloy that contains 96.5% tin, 3% silver, and 0.5% copper) for metal input 28 and a carrier fluid 30 (e.g., polyethylene glycol dimethyl ether 2000) containing a reagents 32 for formation of shell coating 16. In one or more arrangements, a liter of polyethylene glycol dimethyl ether 2000 carrier fluid 30 and a mass of 12 grams of the reagent 32 (e.g., an organic component for formation of the shell 16) is introduced into the enclosure 20 and are slowly heated to 260° C. In this example, the liquid is mixed under an air atmosphere until the reagent 32 is dissolved. In this example, a spool of SAC305 solder wire without a flux core weighing 1 kg total is added to the solution and heated for 15 minutes.

In one or more arrangements, bearings 192 and/or seal 188 are pressurized to 50 psi with nitrogen, the enclosure 20 is sealed, and the enclosure 20 is pressurized to 48 psi with air. The pressure differential leads to a flow of gas out of the enclosure 20 and into a vented system.

In this example, the shearing assembly 40 is operated at approximately 20,000 RPM and the molten metal SAC305 mass is sheared into microparticles 14. The metal is sheared for approximately 600 seconds. In this example, during this processing, the reagent 32 reacts with SAC 305 particles 14 to form a coating 16 thereon in situ.

After this time, the air pressure is decreased followed by the nitrogen pressure until they are both off. In this example, the upper door assembly 36 on top of enclosure 20 is then opened to air. In this example, the lower door assembly 38 is then opened to release and drop the suspension of coated molten SAC305 microcapsules into cooling tank 26 (or other collection vessel) with warm (80° C.) carrier fluid to quench the temperature of the hot carrier fluid suspension. In this example, the cooled suspension is then filtered warm to recover the clean supercooled liquid metal microcapsules.

Gold Tin (Au80Sn20) Cores, Melting Point 280° C.

As another illustrative example, in one or more embodiments, metallic core-shell particles 12 are created using Au80Sn20 for metal input 28 and a carrier fluid 30 containing a reagents 32 for formation of shell coating 16. In one or more arrangements, a liter of ionic liquid carrier fluid 30 is introduced into the enclosure 20 and slowly heated to 300° C. An ingot of Au80Sn20 metal input 28 weighing 200 g total is added to the enclosure 40 and heated with the carrier fluid 32 and reagent 32 for 15 minutes.

In one or more arrangements, the bearings 192 and/or seal 188 are pressurized to 50 psi with nitrogen, the enclosure 20 is sealed, and the enclosure 20 is pressurized to 48 psi with 5% oxygen in nitrogen. The pressure differential leads to a flow of gas out of the enclosure 20 and into a vented system.

In this example, the shearing assembly 40 is operated at approximately 25,000 RPM and the molten metal AuSn metal input 28 is sheared into microparticles 14. In this example, the metal is sheared for approximately 600 seconds. During this processing, the reagent 32 reacts with AuSn microparticles 14 to form a metal oxide coating 16 thereon in situ.

In this example, the shearing and heating are then stopped and the equipment is allowed to cool to 160° C. In this example, the 5% oxygen pressure is then decreased followed by the nitrogen pressure until they are both off. In this example, the upper door assembly 36 on top of enclosure 20 is then opened to air. In this example, the lower door assembly 38 is then opened to release and drop the suspension of coated molten AuSn particles 14 into cooling tank 26 (or other collection vessel) with room temperature triethlyene glycol with organic shell previously dissolved within. The organic component bonds to the metal oxide on particles 14. This process quenches the temperature of the hot carrier fluid suspension. In one or more arrangements, the cooled suspension is then filtered to recover the clean solid metal core shell particles. In one or more arrangements, the supercooled liquid phase is recoverable to form undercooled mentality core shell particles 12 by heating the particles above the melting point of the alloy and then cooling back down to a temperature above the solidification temperature.

Au88Ge12 Cores, Melting Point 356° C.

As yet another illustrative example, in one or more embodiments, metallic core-shell particles 12 are created using Au88Ge12 for metal input 28 and a carrier fluid 30 containing a reagents 32 for formation of shell coating 16. In one or more arrangements, a 200 g ingot of Au88Ge12 metal input 28 and carrier fluid 30 reagent 32 mixture (e.g., a high temperature liquid phase heat transfer fluid with excellent thermal stability, like BMIM $PF_6$ ionic liquid) are added into the enclosure 20. The enclosure 20 is filled with argon and the fluid and metal are heated to 385° C.

In one or more arrangements, the bearings 192 and/or seal 188 are pressurized to 50 psi with nitrogen and the enclosure 20 is pressurized to 48 psi with 1% oxygen in argon. The pressure differential leads to a flow of gas out of the enclosure 20 and into a vented system. In this example, the shearing assembly 40 is operated at approximately 30,000 RPM and the molten metal Au88Ge12 mass is sheared into microparticles 14. In this example, the metal is sheared for approximately 1500 seconds. During this processing, the reagent 32 reacts with Au88Ge12 microparticles 14 to form a metal oxide coating 16 thereon in situ.

In this example, the shearing and heating are then stopped and the equipment is allowed to cool to approximately 160° C. In this example, the 1% oxygen pressure is then decreased followed by the nitrogen pressure until they are both off. In one or more arrangements, a flow of hot acetic acid vapor in air is then piped into the enclosure 20 and the microcapsules stirred at approximately 20 RPM for approximately 5 min using shearing assembly 40. In this example, the upper door assembly 36 on top of enclosure 20 is then opened to air. In this example, the lower door assembly 38 is then opened to release and drop the suspension of coated molten Au88Ge12 microcapsules into cooling tank 26 (or other collection vessel) with room temperature triethlyene glycol. This quenches the temperature of the hot carrier fluid suspension. In this example, the cooled suspension is then filtered to recover the clean solid metallic core shell particles. In one or more arrangements, the supercooled liquid phase of the particles is then recoverable to form undercooled mentality core shell particles 12 by heating the microcapsules above the melting point of the alloy and then cooling back down to a temperature above the solidification temperature as determined by DSC.

Mass Production System:

In one or more arrangements, enclosure 20 is formed as part of a larger system further including input tanks 22 for holding the molten metal input 28, carrier fluid 30 and/or one or more reagents 32, a transfer mechanism 24 connected to the input tanks 22 and enclosure 20, and a cooling tank 26 configured to receive processed materials when ejected from enclosure 20.

Tanks 22:

Tanks 22 are formed of any suitable size, shape, and design and are configured to hold and heat inputs (e.g., metal input 28, carrier fluid 30, and/or one or more reagents 32) before they are added to the enclosure 20. In an example arrangement, tanks 22 are formed of corrosive resistant material and include one or more valves to facilitate moving metal input 28, carrier fluid 30, and/or one or more reagents 32 into and out of the tanks 22. In one or more arrangements, one or more tanks 22 may include heating elements to facilitate heating of the metal input 28, carrier fluid 30 and/or one or more reagents 32.

Transfer Mechanism 24:

Transfer mechanism 24 is formed of any suitable size, shape, and design and is configured to transfer inputs (e.g., metal input 28, carrier fluid 30, and/or one or more reagents 32) from tanks 22 to enclosure 20. In some various different arrangements transfer mechanism may include but is not limited to tubes, pipes, hoses, values, pumps, and/or any other method or means for transferring matter.

Cooling Tank 26:

Cooling Tank 26 is formed of any suitable size, shape, and design and is configured to receive materials that are ejected from enclosure 20 through opening 64 in bottom 60 of the enclosure 20 and facilitate cooling of the contents. In an example arrangement, cooling tank 26 is formed of corrosive resistant material. In one or more arrangements, one or more tanks 22 may include a cooling system to facilitate rapid cooling of the content. Such a cooling system may include but is not limited to, for example, cooling coils, thermoelectric cooling elements, injection of cooled material (e.g., liquid nitrogen), and/or any other method or mechanism of cooling.

In one or more arrangements, cooling tank is used as a settling tank to facilitate separation of the manufactured undercooled metallic core-shell particles 12 from the carrier fluid 30 and reagents 32.

Additionally or alternatively, in some arrangements, system 10 may include a separation system 270. Separation system 270 is formed of any suitable size, shape and design and is configured to receive undercooled metallic core-shell particles 12, carrier fluid 30 and reagents 32 from cooling tank 26 and separate the metallic core-shell particles 12 from the carrier fluid 30 and reagents 32 while maintaining cores 14 in the undercooled metastable state. I In some various arrangements, separation system 20 may be configured to separate carrier fluid 30 and/or reagents 32 from the undercooled metallic core-shell particles 12 using various different methods and means including but not limited to, for example, strainers, screens, filters, centrifuges, settling tanks, and/or any other method or means for separating solids from fluids. In one or more arrangements, the separation system 270 separation system 270 is configured to provide the separated carrier fluid 30 and reagents 32 back to enclosure 20 so it may be reused for processing of additional metallic core-shell particles 12.

In one or more arrangements, separation system 270 may be configured to clean metallic core-shell particles 12 to remove any residual carrier fluid 30 and reagents 32 from the undercooled metallic core-shell particles 12. Carrier fluid 30 and reagents 32 may be removed from the undercooled metallic core-shell particles 12 using various methods or means including but not limited to, for example, rinsing and/or washing, blowing, absorbent materials, mechanical removal, and/or any other methods of means for removal of residual materials, In one or more arrangements, separation system 270 may additionally or alternatively be configured to neutralize residual reagents 32 remaining on the undercooled metallic core-shell particles 12 (e.g., by applying a neutralizing agent to the undercooled metallic core-shell particles 12).

In one or more arrangements, separation system 270 may include a cooling stage assembly 272. Cooling stage assembly 272 is formed of any suitable size, shape, and design and is configured to receive the heated metallic core-shell particles 12, carrier fluid 30, and/or reagents 32 from enclosure 20 and cool the metallic core-shell particles 12 carrier fluid 30, and/or reagents 32 to place the particles 12 into an undercooled liquid state. For example, in one or more arrangements, cooling stage assembly 272 may include one or more cooling elements (not shown) to facilitate cooling of the particles 12. In one or more arrangements, cooling elements are electric cooling elements (such as a Peltier cooling element). However, embodiments are not so limited. Rather, it is contemplated that in one or more arrangements particles 12 may be cooled using any type of cooling system including but not limited to thermoelectric cooling elements, liquid cooling elements, heat pumps, or any other means or method for cooling.

Figure 25:
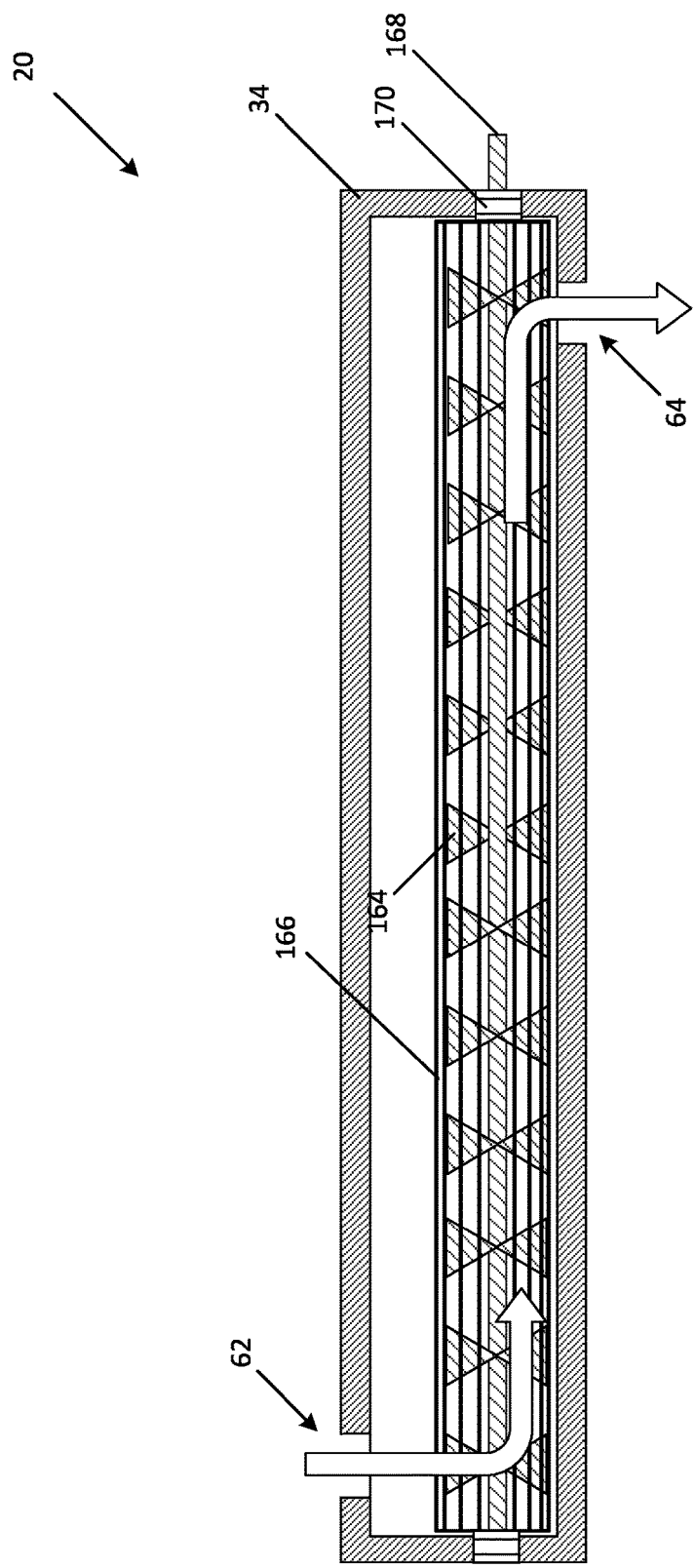
FIG. 25 shows a front cross sectional view of another enclosure system for producing metallic core-shell particles in a continuous flow process, in accordance with one or more arrangements.
Figure 26:
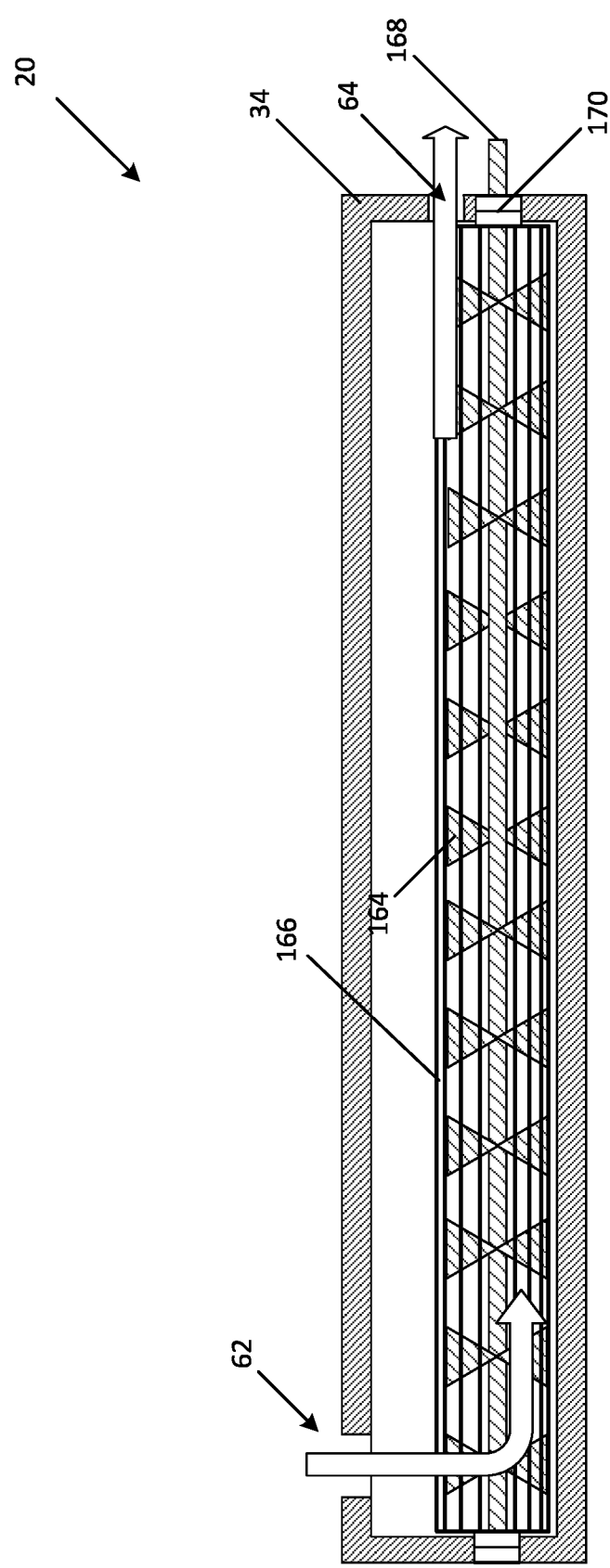
FIG. 26 shows a front cross sectional view of another enclosure system for producing metallic core-shell particles in a continuous flow process, in accordance with one or more arrangements.
Figure 27:
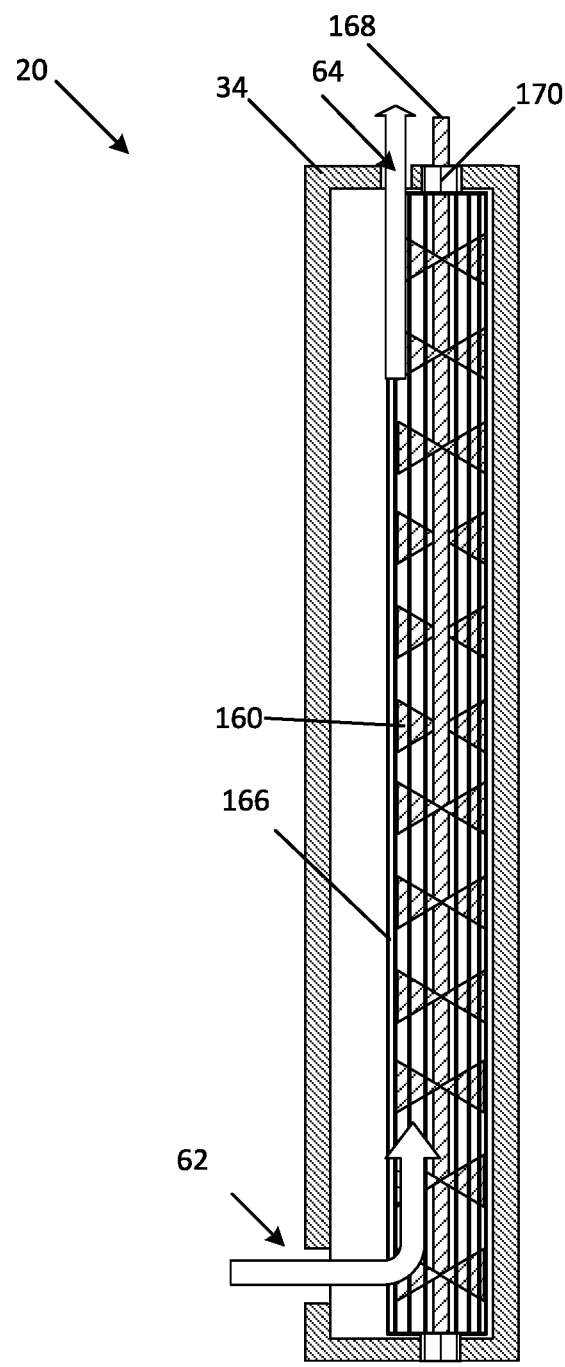
FIG. 27 shows a front cross sectional view of another enclosure system for producing metallic core-shell particles in a continuous flow process, in accordance with one or more arrangements.
Figure 28:
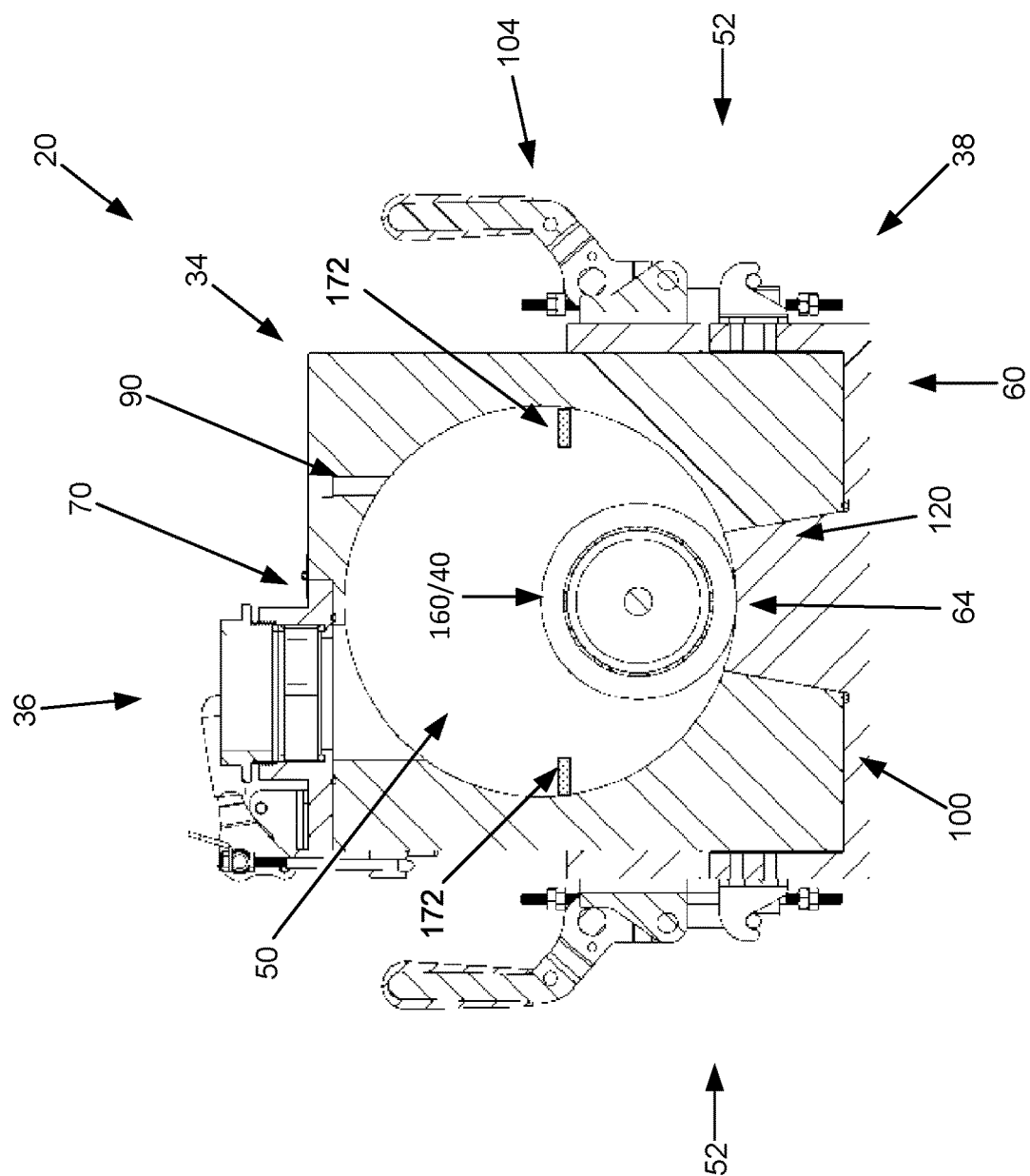
FIG. 28 shows a right side cross sectional view of an enclosure system for producing metallic core-shell particles, in accordance with one or more arrangements; the cross sectional view showing baffles positioned within enclosure system to direct flow of inputs in the process of producing metallic core-shell particles.
Figure 29:
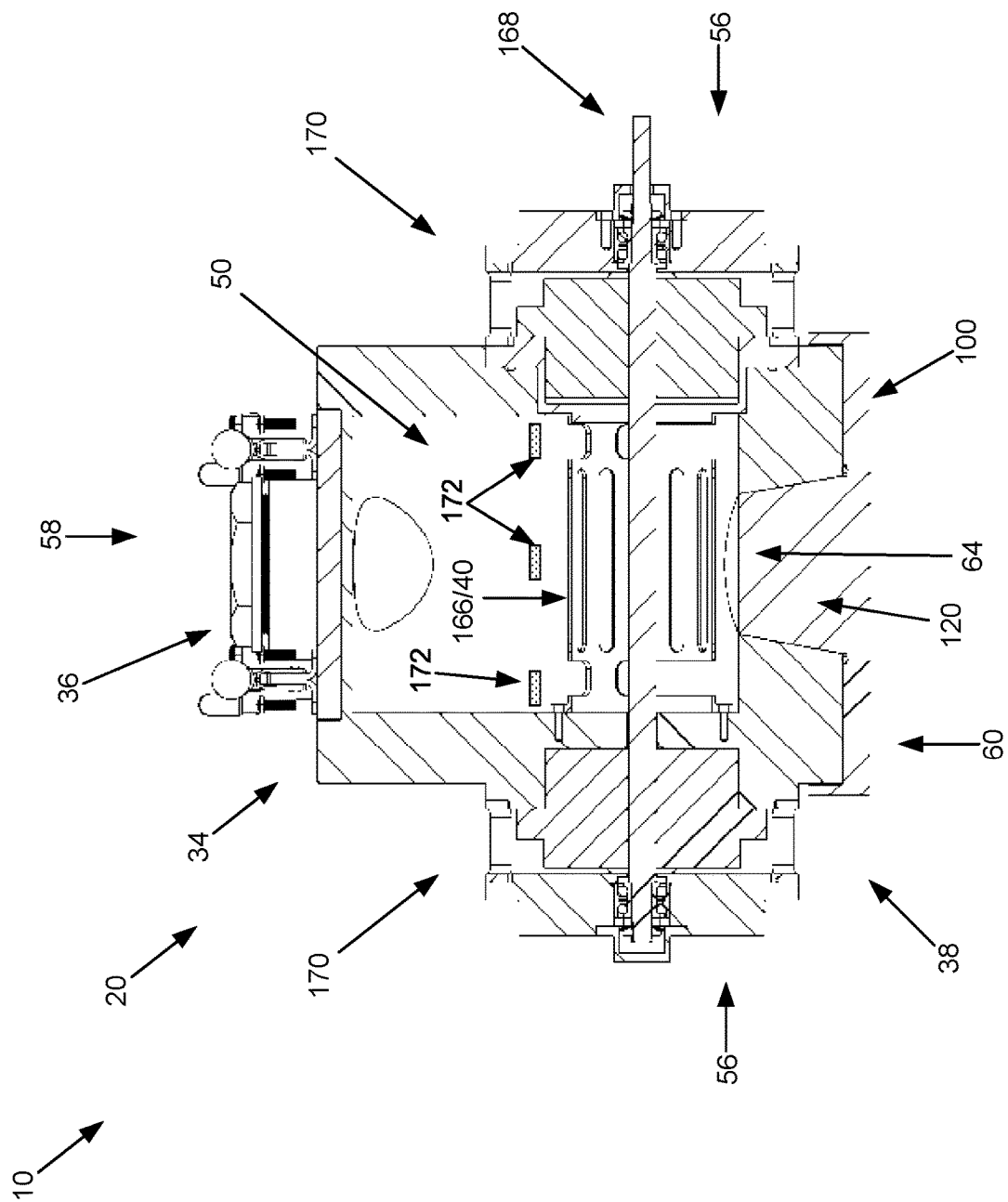
FIG. 29 shows a front cross sectional view of an enclosure system for producing metallic core-shell particles, in accordance with one or more arrangements; the cross sectional view showing baffles positioned within enclosure system to direct flow of inputs in the process of producing metallic core-shell particles.
Figure 30A:
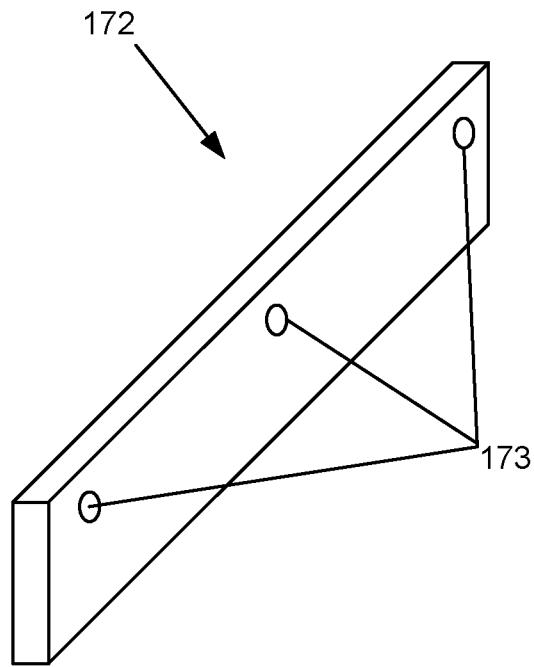
FIG. 30A shows an upper rear left perspective view of an example baffle that may be used to direct flow of inputs within an enclosure system for producing metallic core-shell particles, in accordance with one or more arrangements.
Figure 30B:
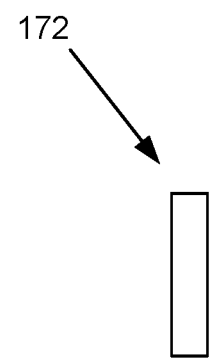
FIG. 30B shows a right side view of the example baffle shown in FIG. 30A, in accordance with one or more arrangements.
Figure 30C:
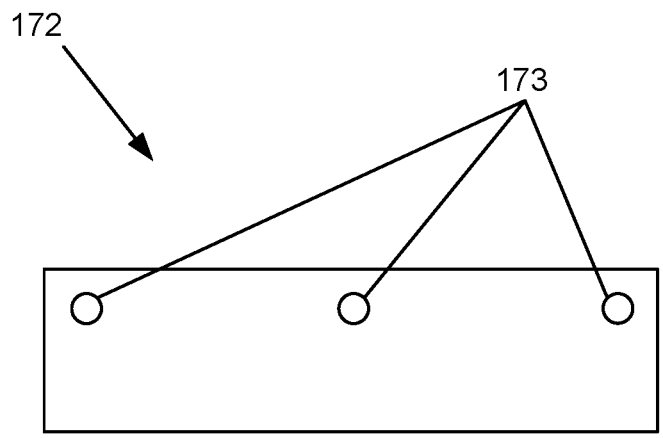
FIG. 30C shows a front view of the example baffle shown in FIG. 30A, in accordance with one or more arrangements.
Figure 31:
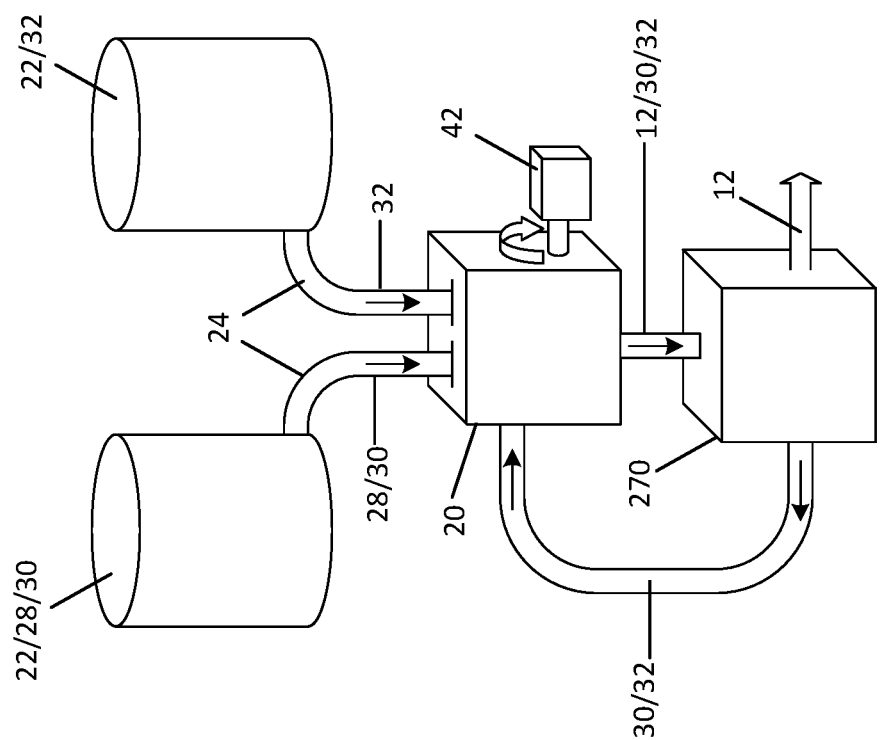
FIG. 31 shows a shows a diagram of an enclosure system for producing metallic core-shell particles, in accordance with one or more arrangements; the view showing system having a separation system configured to separate carrier fluid and reagents from produced undercooled metallic core-shell particles for reuse.

Alternative Continuous Flow Arrangement:

Although the arrangements are primarily discussed with reference to batch processing of inputs in enclosure 20 to form undercooled metallic core-shell particles 12, embodiments are not so limited. Rather, it is contemplated that in one or more arrangements, enclosure 20 may be configured for continuous flow processing. FIGS. 25-27 shows cross sections of some example enclosures 20 for alternative systems 10 configured for continuous flow processing. The features of the enclosure 20 are similar to features of enclosure 20 discussed with reference to FIGS. 1-24 and therefore all of the teaching presented herein with respect to FIGS. 1-24 applies equally to and is incorporated into the enclosure 20 presented in FIG. 25-27 unless specifically stated otherwise. The enclosure 20 shown in FIG. 25-27 is similar to the enclosure 20 shown in FIGS. 1-24, with the primary difference being that upper door assembly 36 and lower door assembly 38 are omitted to facilitate continuous flow of materials in through opening 62 through hollow interior 50 of enclosure 20, and out through opening 64.

In the arrangement shown in FIG. 25, as one example, the length of enclosure 20 between sides 56 is elongated with opening 62 in top 58 positioned at one end and opening 64 of bottom 60 positioned at the other end. In this example arrangement, shearing assembly 40 extends the length of the hollow interior 50 of enclosure 20 and is configured to process inputs (e.g., metal input 28, carrier fluid 30, and/or one or more reagents 32) as the inputs flow from one end of the enclosure to the other end and out of opening 64. In this example arrangement, enclosure 20 extends a length sufficient to complete processes the inputs to form metallic core-shell particles 12 before exiting opening 64. It is recognized that the time that inputs are processed in enclosure 20 depends on the length of enclosure 20 and the flow rate of materials through enclosure 20.

In one or more arrangements, flow rate may be adjusted by adjusting the angle of enclosure. In other words, flow rate may be adjusted by adjusting the slope of the path that materials travel through enclosure. Additionally or alternatively, in one or more arrangements, system 10 may include a flow control assembly 264 (not shown) connected to opening 64 in bottom. Flow control assembly 264 is formed of any suitable size, shape, or design, and is configured to control the rate at which contents of enclosure exit enclosure through opening 64 in bottom. In one or more various arrangements, flow control assembly 264 may include but is not limited to, for example, valves, priority vales, deceleration valves, apertures, flow regulators, bypass flow regulators, demand-compensated flow controls, pressure-compensated flow regulators, and any other method or device for controlling flow rate of materials.

Centrifugal Output of Undercooled Metallic Core-Shell Particles:

In one or more arrangements, enclosure 20 is configured to sort particles of the metal input 28 by size using centripetal force to facilitate output of undercooled metallic core-shell particles 12 from enclosure 20. In the arrangements shown in FIGS. 26 and 27, for example, opening 64 is positioned so smaller particles of a desired size will be passed through opening 64 when contents 28/30/32 of enclosure 20 are spun as shearing assembly 40 is rotated during operation. However, the embodiments are not so limited. For example, in one or more arrangement, a dip tube (not shown) may be connected to opening 64 to facilitate removal of contents 28/30/32 from various positions within hollow interior 50 of enclosure 20. Depending on the desired size of undercooled metallic core-shell particles 12 to be produced, the end of dip tube not connected to opening 64 may be moved to closer to or further away from the inner wall of housing 34 to facilitate removal of particles of the desired size. Additionally or alternatively, in one or more arrangements, system 10 may include a separation system 270 configured to receive a continuous flow of the heated metallic core-shell particles 12 from enclosure 20 and continuously separate the metallic core-shell particles 12 from the carrier fluid 30 and reagents 32 while maintaining cores 14 in the undercooled metastable state.

From the above discussion it will be appreciated that system 10 presented herein improves upon the state of the art and provides a system: that improves upon the state of the art; that reduces manufacturing time; that increases yields; that can produce undercooled metallic core-shell particles from materials with higher melting temperatures; that reduces power requirements; that increases throughput; that is easy to use; that improves functionality; that is relatively inexpensive; that is adaptable for manufacture of different products; that can control temperature while processing materials; that can control pressure while processing materials; that can control flow of materials while processing the materials; that can control and adjust atmosphere and reagents while processing materials; that is relatively inexpensive; that has a minimum number of parts; that is durable; and/or that has a long useful life. These and other objects, features, or advantages of the present disclosure will become apparent from the specification and claims.

Although the present disclosure has been described with respect to certain illustrative embodiments, those skilled in the art will appreciate is not limited to these embodiments and that changes and modifications can be made therein within the scope of the disclosure as set forth in the appended claims.

SELECTED REFERENCE NUMERALS

10—System
12—Undercooled Metallic Core-Shell Particles
14—Core (of particles 12)
16—Coating (of particles 12)
20—Enclosure
22—Input Tanks
24—Transfer Mechanism
26—Cooling Tank
28—Metal Input
30—Carrier Fluid
32—Reagent
34—Housing
36—Upper Door Assembly
38—Lower Door Assembly
40—Shearing Assembly
42—Motor
44—In-situ control system
50—Hollow Interior (of Housing 34)
52—Front (of Housing 34)
54—Back (of Housing 34)
56—Sides (of Housing 34)
58—Top (of Housing 34)
60—Bottom (of Housing 34)
62—Opening (of Top 58)
64—Opening (of Bottom 60)
66—Openings (of Sides 56)
70—Door (of Upper Door Assembly 36)
72—Hinge Members (of Upper Door Assembly 36)
74—Latch Mechanism (of Upper Door Assembly 36)
76—Seal (of Upper Door Assembly 36)
78—Opening (of Upper Door Assembly 36)
80—Flange (of Upper Door Assembly 36)
82—Window (of Upper Door Assembly 36)
84—Seals (of Upper Door Assembly 36)
86—Threaded Cover (of Upper Door Assembly 36)
90—Openings in Top 58
92—Holes in Top 58
96—Heating Elements (not shown)
100—Door (of Lower Door Assembly 38)
104—Latch Assembly (of Lower Door Assembly 38)
110—Forward Edge (of Door 100)
112—Rearward Edge (of Door 100)
114—Opposing Side Edges (of Door 100)
116—Flange (of Door 100)
120—Plug (of Door 100)
122—Side (of Door 100)
124—Top (of Door 100)
126—Seal (of Door 100)
128—Drain Holes (of Door 100)
132—Upper Flange Portions (of Door 100)
136—Mounting Blocks (of Latch Assembly 104)
138—Latch Mechanisms (of Latch Assembly 104)
140—Slide Assemblies (of Latch Assembly 104)
144—Slide Brackets (of Slide Assemblies 140)
146—Slide Bolts (of Slide Assemblies 140)
148—Nuts (of Slide Assemblies 140)
152—Body (of Slide Brackets 144)
154—Slide Hole (of Slide Brackets 144)
156—Flanges (of Slide Brackets 144)
158—Holes (of Slide Brackets 144)
164—Impellers (of Shearing Assembly 40)
166—Stator (of Shearing Assembly 40)
168—Shaft (of Shearing Assembly 40)
170—Bearing Assembly (of Shearing Assembly 40)
172—Baffles
173—Holes (of Baffles 172)
174—Ends (of Stator 166)
176—Circular Flange (of Stator 166)
178—Slots (of Stator 166)
184—Seal Centering Member (of Assembly 170)
186—Positioning Brace Member (of Assembly 170)
188—Seal (of Assembly 170)
190—Bearing Centering Lid (of Assembly 170)
192—Bearings (of Assembly 170)

194—Shim (of Assembly 170)
196—Washer (of Assembly 170)
198—Nut (of Assembly 170)
200—Cover (of Assembly 170)
204—Circular Flange (of seal centering member 184)
206—Openings (of Positioning Brace Member 186)
208—Nitrogen Gas Inlet Outlet System
212—Body (of bearing centering lid 190)
214—Cylindrical Hole (of bearing centering lid 190)
216—Flange (of bearing centering lid 190)
220—Control Circuit
222—User Interface (of Control Circuit 220)
224—Sensors (of Control Circuit 220)
228—Processing Circuit (of Control Circuit 220)
230—Memory (of Control Circuit 220)
232—Communication Circuit (of Control Circuit 220)
236—Code (of Control Circuit 220)
240—Inputs of User Interface 222
242—Display of User Interface 222
250—Process Block (of FIG. 18)
252—Process Block (of FIG. 18)
254—Process Block (of FIG. 18)
256—Process Block (of FIG. 18)
258—Process Block (of FIG. 18)
260—Process Block (of FIG. 18)
264—Flow Control Assembly (not shown)
270—Separation System
272—Cooling Stage Assembly (of Separation System 270)

What is claimed is:

1. A method for producing metallic core-shell particles, the steps comprising:
providing a housing having a hollow interior and having a shearing assembly positioned within the hollow interior of the housing;
placing and holding a molten metal input, a carrier fluid, and one or more reagents in the hollow interior of the housing;
wherein the shearing assembly includes:
a shaft positioned within the hollow interior of the housing;
one or more impellers connected to the shaft; and
a stator positioned within the hollow interior of the housing;
with the molten metal input, the carrier fluid, and the one or more reagents held within the hollow interior and sealed within the housing, shearing the molten metal input into particles of an effective size having a shell created on a surface of the particles via reaction with the one or more reagents that prevents a core of the particles from solidifying when the particles are cooled to a temperature below a freezing temperature of the molten metal input;
wherein the shearing includes rotating the one or more impellers connected to the shaft and positioned within the hollow interior of the housing; and
wherein, when the shaft and the one or more impellers are rotated, the molten metal input is sheared by the one or more impellers.

2. The method of claim 1, further comprising controlling a temperature of the hollow interior of the housing using a temperature control assembly.

3. The method of claim 1, wherein the shearing is performed using a shearing assembly including:
a shaft positioned within the hollow interior of the housing;
one or more impellers connected to the shaft; and
a stator positioned within the hollow interior of the housing.

4. The method of claim 1, further comprising cooling the particles to a temperature below a freezing temperature of the molten metal input to form the metallic core-shell particles.

5. The method of claim 1, wherein the molten metal input, the carrier fluid, and the one or more reagents are placed into the hollow interior of the housing through an opening in a top of the housing.

6. The method of claim 1, further comprising removing the metallic core-shell particles, the carrier fluid, and the reagents from the housing through an opening in a bottom of the housing.

7. The method of claim 1, further comprising:
removing the metallic core-shell particles, the carrier fluid, and the reagents from the housing;
separating the removed carrier fluid and reagents from the removed metallic core-shell particles;
providing the separated carrier fluid and the one or more reagents to the housing.

8. A system for producing metallic core-shell particles, comprising:
a housing;
the housing having a hollow interior;
wherein the hollow interior is configured to receive a molten metal input, a carrier fluid, and one or more reagents;
a shearing assembly positioned within the hollow interior of the housing;
wherein the shearing assembly is configured to, when the molten metal input, the carrier fluid, and the one or more reagents are held within the hollow interior and sealed within the housing, shear the molten metal input into particles of an effective size so that a shell created on a surface of the particles via reaction with the one or more reagents prevents a core of the particles from solidifying when the particles are cooled to a temperature below a freezing temperature of the molten metal input;
wherein the shearing assembly includes:
a shaft positioned within the hollow interior of the housing;
one or more impellers connected to the shaft; and
a stator positioned within the hollow interior of the housing;
wherein, when the shaft and the one or more impellers are rotated, the molten metal input is sheared by the one or more impellers.

9. The system of claim 8,
wherein the housing has a front, a back, a top, a bottom, and opposing sides;
the front, back, top, bottom, and opposing sides forming the hollow interior;
wherein the housing includes an opening in each of the opposing sides;
wherein the shaft is connected to the housing by a bearing assembly positioned in the opening in each of the opposing sides.

10. The system of claim 8,
wherein the housing has a front, a back, a top, a bottom, and opposing sides;
the front, back, top, bottom, and opposing sides forming the hollow interior;
wherein the housing includes an opening in each of the opposing sides;

wherein the shaft is connected to the housing by a bearing assembly positioned in the opening in each of the opposing sides;
wherein the bearing assembly seals the opening while facilitating rotation of the shaft.

11. The system of claim 8,
wherein the housing has opposing sides,
wherein the housing includes an opening in each of the opposing sides;
wherein the shaft is connected to the housing by a bearing assembly positioned in the opening in each of the opposing sides;
wherein the bearing assembly seals the opening while facilitating rotation of the shaft;
wherein the respective bearing assembly includes:
    a seal centering member operatively connected to the housing;
    a seal positioned within the seal centering member;
    a positioning brace member operatively connected to the seal centering member;
    a bearing centering lid operatively connected to the positioning brace member;
    wherein the seal is held between the seal centering member and bearing centering lid;
    a bearing positioned in a center opening of the bearing centering lid;
    wherein the shaft extends through the seal and bearing;
    a nub positioned on an exterior side of the bearing and threaded onto the shaft.

12. The system of claim 8,
wherein the housing has a front, a back, a top, a bottom, and opposing sides;
the front, back, top, bottom, and opposing sides forming the hollow interior;
wherein the housing includes an opening in each of the opposing sides;
wherein the shaft is connected to the housing by a bearing assembly positioned in the opening in each of the opposing sides;
wherein the bearing assembly seals the opening while facilitating rotation of the shaft;
wherein the bearing assembly includes a gas seal.

13. The system of claim 8, wherein the shearing assembly includes:
wherein the housing has a front, a back, a top, a bottom, and opposing sides;
the front, back, top, bottom, and opposing sides forming the hollow interior;
wherein the housing includes an opening in each of the opposing sides;
wherein the shaft is connected to the housing by a bearing assembly positioned in the opening in each of the opposing sides;
wherein the bearing assembly seals the opening while facilitating rotation of the shaft;
wherein the bearing assembly includes a gas bearing.

14. The system of claim 8, wherein the housing is formed of a corrosive resistant material.

15. The system of claim 8, wherein the shearing assembly is formed of a corrosive resistant material.

16. The system of claim 8, further comprising:
a set of holes in the housing;
a set of heating elements positioned in the set of holes.

17. The system of claim 8, further comprising a motor operably connected to the shearing assembly.

18. The system of claim 8, further comprising:
a heating regulation system operatively connected to the housing;
a motor operably connected to the shearing assembly;
a control circuit communicatively connected to the heating regulation system and the motor;
wherein the control circuit is configured to control temperature in the hollow interior of the housing and control rotation speed of the motor while processing the molten metal input, the carrier fluid, and the one or more reagents to produce the metallic core-shell particles.

19. A system for producing metallic core-shell particles, comprising:
a housing;
the housing having a top and a bottom;
the housing having a hollow interior;
wherein the hollow interior is configured to receive a molten metal input, a carrier fluid, and one or more reagents;
a shearing assembly positioned within the hollow interior of the housing;
wherein the shearing assembly is configured to, when the molten metal input, the carrier fluid, and the one or more reagents are held within the hollow interior and sealed within the housing, shear the molten metal input into particles of an effective size so that a shell created on a surface of the particles via reaction with the one or more reagents prevents a core of the particles from solidifying when the particles are cooled to a temperature below a freezing temperature of the molten metal input;
a first opening in the top of the housing;
an upper door assembly connected to the housing;
the upper door assembly configured to provide access to the hollow interior through the first opening when open and cover and seal the first opening when closed;
a second opening in the bottom of the housing;
a lower door assembly connected to the housing;
the lower door assembly configured to provide access to the hollow interior through the second opening when open and cover and seal the second opening when closed.

20. The system of claim 19,
wherein the upper door assembly includes:
    a door;
    the door configured to cover and seal the first opening when the door is moved to a closed position and uncover the first opening when the door is moved to an open position;
    hinge members;
    the hinge members connected to the door and the top of the housing and configured to permit hinged movement of the door between the open position and the closed position;
    a seal;
    the seal positioned between the door and the top of the housing and configured to provide a seal between the door and the top of the housing when the door is moved to the closed position;
    a latch mechanism;
    the latch mechanism configured to hold the door in the closed position when latched and release door from the closed position when unlatched.

21. The system of claim 19,
wherein the lower door assembly includes:
a door,
the door configured to cover and seal the second opening when the door is raised to a closed position and uncover the second opening when the door is lowered to an open position;
a latch assembly;
the latch assembly connected to the housing and configured to facilitate latching and unlatching of the door to and from the closed position and raising and lowering of the door between the closed position to the open position.

22. The system of claim 19,
wherein the lower door assembly includes:
a door;
the door configured to cover and seal the second opening when the door is raised to a closed position and uncover the second opening when the door is lowered to an open position;
a latch assembly;
the latch assembly connected to the housing and configured to facilitate latching and unlatching of the door to and from the closed position and raising and lowering of the door between the closed position to the open position;
wherein the door includes a plug positioned and configured to be inserted into and mate with the second opening when the door is raised to the closed position, thereby plugging the second opening;
wherein the door includes a seal positioned around the plug and configured to provide a seal between the door and the housing when the door is raised to the closed position wherein the door includes a set of drain holes positioned around the plug.

23. The system of claim 19,
wherein the lower door assembly includes:
a door;
the door configured to cover and seal the second opening when the door is raised to a closed position and uncover the second opening when the door is lowered to an open position;
a latch assembly;
the latch assembly connected to the housing and configured to facilitate latching and unlatching of the door to and from the closed position and raising and lowering of the door between the closed position to the open position;
wherein the latch assembly includes mounting blocks, latch mechanisms, and slide assemblies;
wherein the mounting blocks are configured to facilitate attachment of the latch mechanisms and the slide assemblies to housing;
wherein the latch mechanism is configured to hold the door in the closed position when latched and release the door from the closed position when unlatched;
wherein the slide assemblies are configured to provide a sliding connection between the door and the housing that permits the door to slide between the open position and the closed position.

24. The system of claim 19, further comprising:
a heating element positioned in the housing.

25. A system for producing metallic core-shell particles, comprising:
a housing;
the housing having a hollow interior;
wherein the hollow interior is configured to receive a molten metal input, a carrier fluid, and one or more reagents;
a shearing assembly positioned within the hollow interior of the housing;
wherein the shearing assembly is configured to, when the molten metal input, the carrier fluid, and the one or more reagents are held within the hollow interior and sealed within the housing, shear the molten metal input into particles of an effective size so that a shell created on a surface of the particles via reaction with the one or more reagents prevents a core of the particles from solidifying when the particles are cooled to a temperature below a freezing temperature of the molten metal input;
a first tank configured to hold and heat the molten metal input and the carrier fluid before transferring the molten metal input and carrier fluid into the hollow interior of the housing;
a second tank configured to hold the one or more reagents before transferring the one or more reagents into the hollow interior of the housing;
a transfer mechanism connected to the first tank, second tank, the housing;
the transfer mechanism configured to transfer contents of the first tank and the second tank to the housing.

26. A system for producing metallic core-shell particles, comprising:
a housing means for receiving and holding a molten metal input, a carrier fluid, and one or more reagents; and
a shearing means for shearing the molten metal input within the housing means into particles of an effective size so that a shell created on a surface of the particles via reaction with the one or more reagents prevents a core of the particles from solidifying when the particles are cooled to a temperature below a freezing temperature of the molten metal input;
wherein the shearing means is positioned within a hollow interior of the housing;
wherein the shearing means includes:
a shaft positioned within the hollow interior of the housing;
one or more impellers connected to the shaft; and
a stator positioned within the hollow interior of the housing;
wherein, when the shaft and the one or more impellers are rotated, the molten metal input is sheared by the one or more impellers.

* * * * *

UNITED STATES PATENT AND TRADEMARK OFFICE
CERTIFICATE OF CORRECTION

PATENT NO. : 11,673,190 B2
APPLICATION NO. : 17/564325
DATED : June 13, 2023
INVENTOR(S) : Thuo et al.

It is certified that error appears in the above-identified patent and that said Letters Patent is hereby corrected as shown below:

In the Claims

Column 25, Line 63 Claim 3 should read as follows:
3. The method of claim 1, wherein the shearing is performed using the shearing assembly.

Column 27, Line 45 Claim 13 should read as follows:
13. The system of claim 8, wherein the housing has a front, a back, a top, a bottom, and opposing sides; the front, back, top, bottom, and opposing sides forming the hollow interior; wherein the housing includes an opening in each of the opposing sides; wherein the shaft is connected to the housing by a bearing assembly positioned in the opening in each of the opposing sides; wherein the bearing assembly seals the opening while facilitating rotation of the shaft; wherein the bearing assembly includes a gas bearing.

Column 28, Line 46 Claim 20 should read as follows:
20. The system of claim 19, wherein the upper door assembly includes: a door; the door configured to cover and seal the first opening when the door is moved to a closed position and uncover the first opening when the door is moved to an open position; hinge members; the hinge members connected to the door and the top of the housing and configured to permit hinged movement of the door between the open position and the closed position; a seal; the seal positioned between the door and the top of the housing and configured to provide a seal between the door and the top of the housing when the door is moved to the closed position; a latch mechanism; the latch mechanism configured to hold the door in the closed position when latched and release the door from the closed position when unlatched.

Column 30, Line 35 Claim 26 should read as follows:
26. A system for producing metallic core-shell particles, comprising: a housing means for receiving and holding a molten metal input, a carrier fluid, and one or more reagents; and a shearing means for shearing the molten metal input within the housing means into particles of an effective size so that a shell created on a surface of the particles via reaction with the one or more reagents prevents a core of the particles from solidifying when the particles are cooled to a temperature below a freezing temperature of the molten metal input; wherein the shearing means is positioned within a hollow Signed and Sealed this
First Day of August, 2023

Katherine Kelly Vidal
*Director of the United States Patent and Trademark Office* interior of the housing means; wherein the shearing means includes: a shaft positioned within the hollow interior of the housing means; one or more impellers connected to the shaft; and a stator positioned within the hollow interior of the housing means; wherein, when the shaft and the one or more impellers are rotated, the molten metal input is sheared by the one or more impellers.